United States Patent
Hatada

(10) Patent No.: US 10,634,876 B2
(45) Date of Patent: Apr. 28, 2020

(54) ZOOM LENS AND IMAGE PICKUP APPARATUS INCLUDING SAME

(71) Applicant: CANON KABUSHIKI KAISHA, Tokyo (JP)

(72) Inventor: Takahiro Hatada, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/417,302

(22) Filed: May 20, 2019

(65) Prior Publication Data
US 2019/0271829 A1    Sep. 5, 2019

Related U.S. Application Data

(63) Continuation of application No. 15/905,449, filed on Feb. 26, 2018, now Pat. No. 10,353,171.

(30) Foreign Application Priority Data

Mar. 3, 2017   (JP) ................... 2017-040989

(51) Int. Cl.
| G02B 15/14 | (2006.01) |
|---|---|
| G02B 9/62 | (2006.01) |
| G02B 15/173 | (2006.01) |
| G02B 9/64 | (2006.01) |

(52) U.S. Cl.
CPC .......... *G02B 9/62* (2013.01); *G02B 9/64* (2013.01); *G02B 15/14* (2013.01); *G02B 15/173* (2013.01)

(58) Field of Classification Search
CPC ........................................... G02B 9/62
USPC ........................................... 359/684
See application file for complete search history.

(56) References Cited

U.S. PATENT DOCUMENTS

| 2013/0335617 A1* | 12/2013 | Imaoka .............. G02B 15/173 348/345 |
|---|---|---|
| 2015/0338622 A1 | 11/2015 | Kuzuhara et al. |
| 2015/0350558 A1 | 12/2015 | Uchida et al. |

FOREIGN PATENT DOCUMENTS

JP    2015-018124 A    1/2015

* cited by examiner

*Primary Examiner* — James C. Jones
(74) *Attorney, Agent, or Firm* — Canon U.S.A., Inc. I.P. Division

(57) ABSTRACT

A zoom lens includes a first lens unit L1 having positive refractive power, a second lens unit L2 having negative refractive power, and a rear lens group LB including a plurality of lens units and having positive refractive power. The rear lens group LB includes a lens unit LF configured to move during focusing and having negative refractive power, a lens unit LN disposed on the image side of the lens unit LF and having negative refractive power, and a lens unit LP disposed on the image side of the lens unit LN and having the largest positive refractive power among the lens units having positive refractive power. The lens units LP and LN move to the object side in a predetermined locus during zooming from the wide-angle end to the telephoto end, and the lens units LP and LF satisfy a predetermined conditional expression.

31 Claims, 13 Drawing Sheets

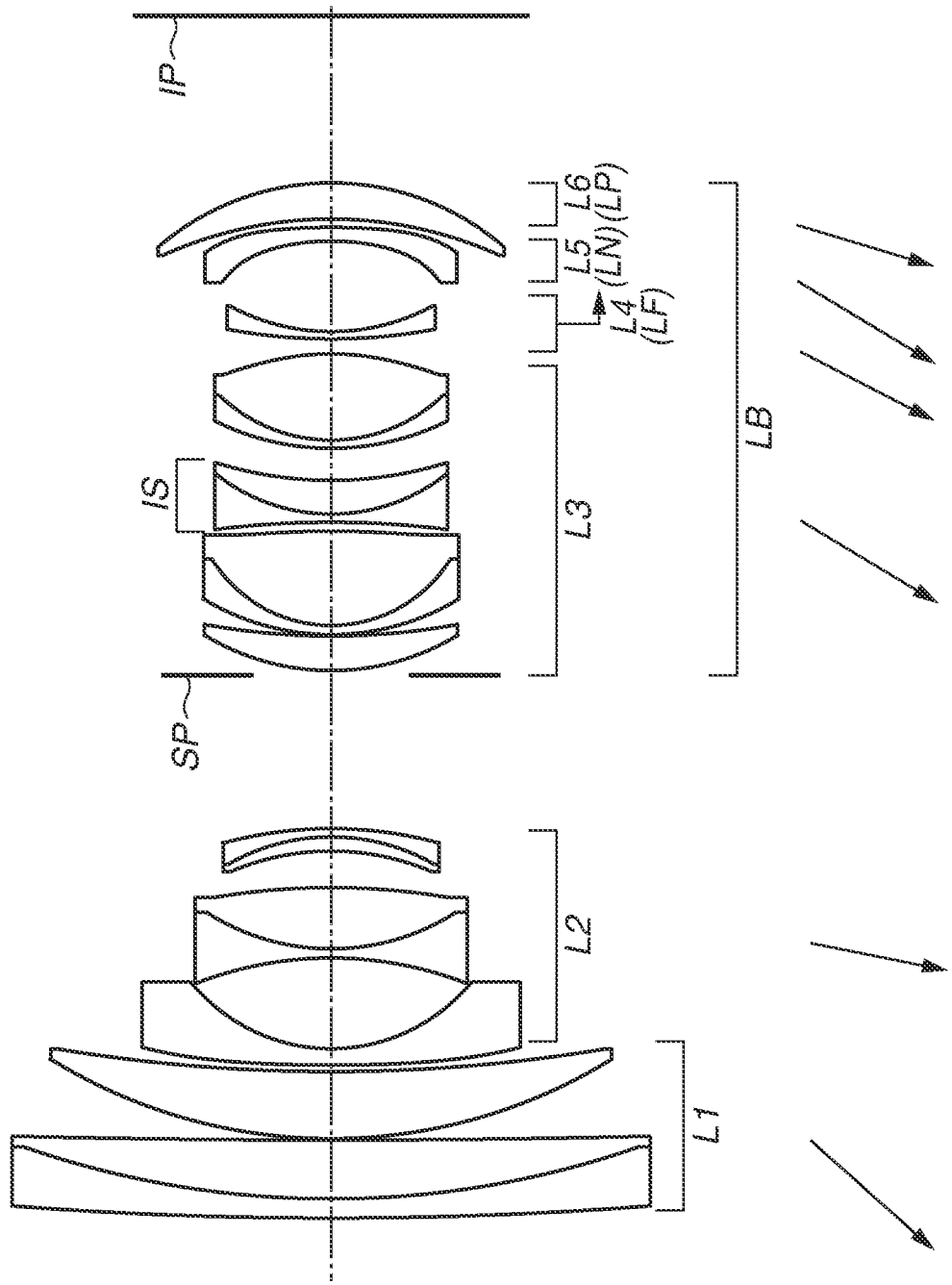

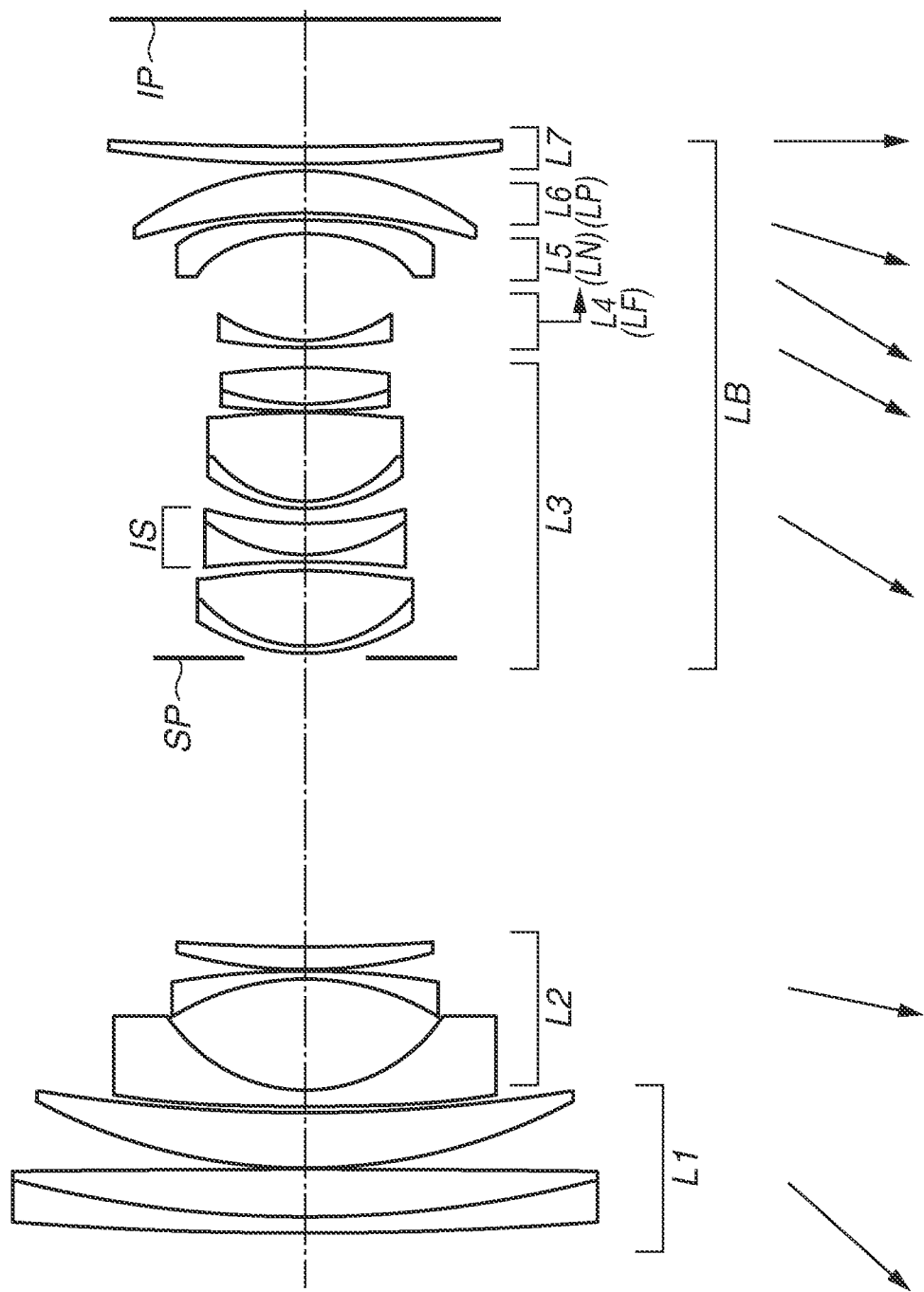

ZOOM LENS AND IMAGE PICKUP APPARATUS INCLUDING SAME

CROSS-REFERENCE TO RELATED APPLICATIONS

This application is a Continuation, and claims the benefit, of U.S. patent application Ser. No. 15/905,449, filed on Feb. 26, 2018, and claims the benefit of, and priority to, Japanese Patent Application No. 2017-040989, filed Mar. 3, 2017, which applications are hereby incorporated by reference herein in their entireties.

BACKGROUND OF THE INVENTION

Field of the Invention

The present invention relates to a zoom lens, and is suitable for a digital video camera, a digital still camera, a broadcasting camera, a silver-halide film camera, a monitoring camera, and other optical apparatuses.

Description of the Related Art

As one form of a zoom lens, there are known positive lead type zoom lenses which adopt an inner focus system or a rear focus system, in which a first lens unit having positive refractive power is disposed closest to an object side and a second lens unit and subsequent lens units perform focusing.

United States Patent Publication Application No. 2014/0362452 discusses a positive lead type zoom lens including a first lens unit having positive refractive power, a second lens unit having negative refractive power, a third lens unit having positive refractive power, a fourth lens unit having negative refractive power, a fifth lens unit having negative refractive power, and a sixth lens unit having positive refractive power. It is discussed that the fourth lens unit is preferably used as a focus lens unit of the zoom lens of United States Patent Publication Application No. 2014/0362452.

In the zoom lens of United States Patent Publication Application No. 2014/0362452, refractive power of the sixth lens unit is extremely smaller than that of the fourth lens unit performing focusing. For this reason, there has been a problem that, when the zoom lens is made compact, it is difficult to lengthen a distance from an exit pupil to an image plane at a wide-angle end while setting focus sensitivity to a value within a range where drive control of the focus lens unit can be easily performed.

SUMMARY OF THE INVENTION

The present invention is directed to a positive lead type zoom lens capable of easily performing drive control of a focus lens unit and lengthening distance from an exit pupil to an image plane at a wide-angle end.

A zoom lens according to an exemplary embodiment of the present invention includes a first lens unit having positive refractive power, a second lens unit having negative refractive power, and a rear lens group including a plurality of lens units and having positive refractive power, the first lens unit, the second lens unit, and the rear lens group being disposed in order from an object side to an image side, wherein a distance between adjacent lens units changes during zooming, wherein the rear lens group includes a lens unit LF configured to move during focusing and having negative refractive power, a lens unit LN disposed on the image side of the lens unit LF and having negative refractive power, and at least one lens unit disposed on the image side of the lens unit LN and having positive refractive power, wherein a lens unit LP and the lens unit LN, the lens unit LP having the largest refractive power among the at least one lens unit having positive refractive power, move to the object side such that a distance between the lens unit LP and the lens unit LN increases during zooming from a wide-angle end to a telephoto end, and wherein the following conditional expression is satisfied:

$$0.36 < |fLF/fLP| < 1.30$$

where fLP is a focal length of the lens unit LP and fLF is a focal length of the lens unit LF.

Further features of the present invention will become apparent from the following description of exemplary embodiments with reference to the attached drawings.

BRIEF DESCRIPTION OF THE DRAWINGS

FIG. 4 is a cross-sectional view of a zoom lens according to a second exemplary embodiment when focusing at infinity at a wide-angle end.

FIG. 10 is a cross-sectional view of a zoom lens according to a fourth exemplary embodiment when focusing at infinity at a wide-angle end.

DESCRIPTION OF THE EMBODIMENTS

Figure 1:
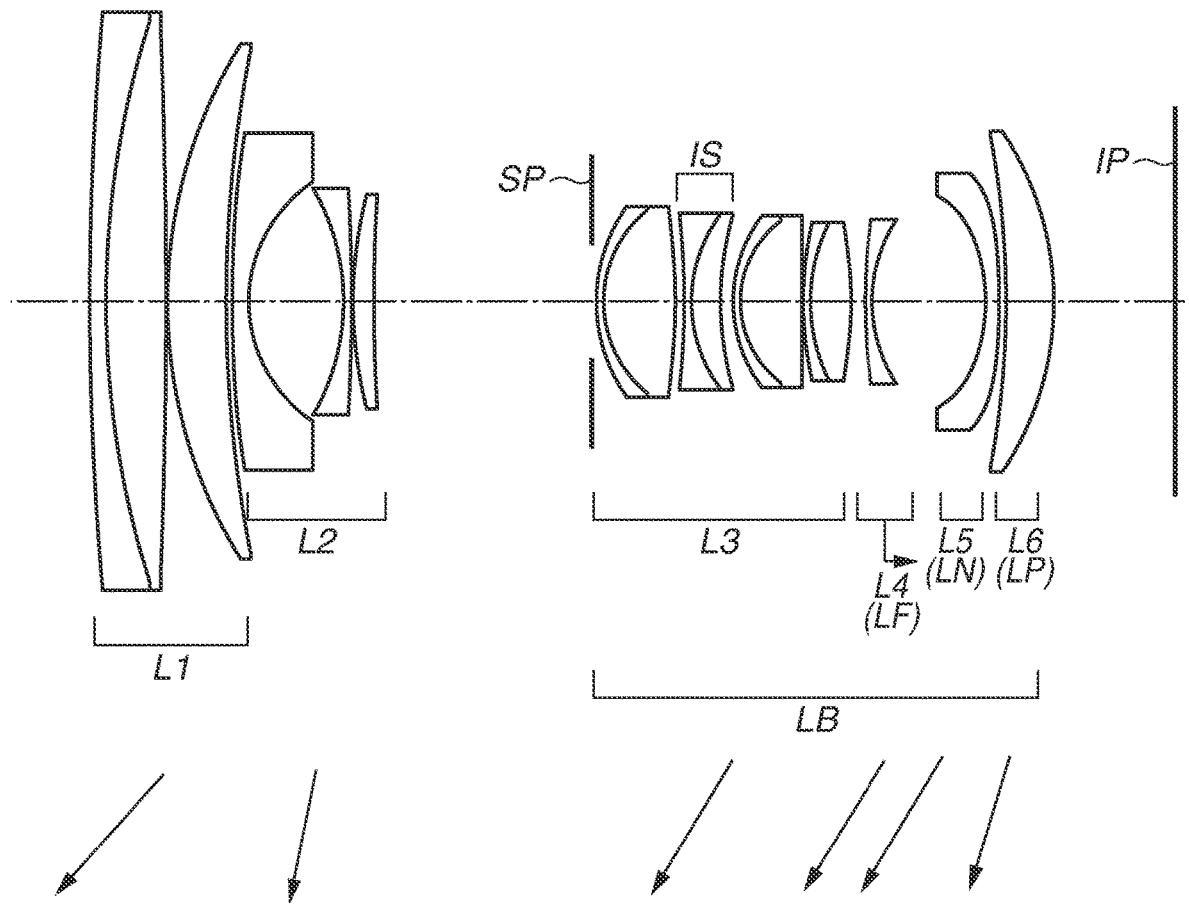
FIG. 1 is a cross-sectional view of a zoom lens according to a first exemplary embodiment when focusing at infinity at a wide-angle end.

Hereinbelow, exemplary embodiments of a zoom lens according to the present invention and an image pickup apparatus including the zoom lens will be described. The zoom lens according to each exemplary embodiment is an image pickup optical system used for an image pickup apparatus such as a digital still camera, a digital video camera, a broadcasting camera, a silver-halide film camera, and a monitoring camera. In addition, the zoom lens according to each exemplary embodiment can also be used as a projection optical system for a projector.

FIGS. 1, 4, 7, and 10 are cross-sectional views of zoom lenses according to first to fourth exemplary embodiments when focusing at infinity at a wide-angle end. In each cross-sectional view, an aperture diaphragm SP and an image plane IP are illustrated. When the zoom lens according to each exemplary embodiment is used as the image pickup optical system for video cameras or digital cameras, an image pickup element such as a charge coupled device (CCD) sensor or a complementary metal oxide semiconductor (CMOS) sensor is disposed on the image plane IP. When the zoom lens according to each exemplary embodiment is used as the image pickup optical system for the silver-halide film camera, a film is disposed on the image plane IP. In addition, when the zoom lens according to each exemplary embodiment is used as the projection optical system for projectors, a light modulation element that modulates light from a light source to form image light is disposed on the image plane IP. As the light modulation element, a liquid crystal panel or the like is used.

In addition, in each cross-sectional view, a lens unit IS having an image stabilization function is illustrated. By moving the lens unit IS in a direction including a vertical component, fluctuation of an image position caused by camera shake and the like can be corrected.

The zoom lens according to each exemplary embodiment is a positive lead type zoom lens including a first lens unit L1 having positive refractive power, a second lens unit L2 having negative refractive power, and a rear lens group LB including a plurality of lens units and having positive refractive power. The first lens unit L1, the second lens unit L2, and the rear lens group LB are disposed in this order from an object side to an image side.

Arrows in each cross-sectional view schematically illustrate a movement locus of each lens unit during zooming from the wide-angle end to a telephoto end. In the zoom lens according to each exemplary embodiment, a distance between adjacent lens units changes during zooming. In each cross-sectional view of the lens, a left side is the object side (a screen side in the projection optical system for a projector) and a right side is the image side (an original image side in the projection optical system for a projector).

Here, a configuration of the rear lens group LB in the zoom lens according to each exemplary embodiment will be described.

The rear lens group LB includes a lens unit LF having negative refractive power and a lens unit LN disposed on the image side of the lens unit LF and having negative refractive power. The zoom lens according to each exemplary embodiment adopts a rear focus system in which focusing is performed by moving the lens unit LF in a direction along an optical axis.

In contrast to a front lens focus system in which focusing is performed by moving the first lens unit, in the rear focus system, focusing is performed by the lens unit disposed at a position where an effective diameter of a light beam becomes small. Accordingly, a focus lens unit can be made compact and lightweight. Therefore, focusing can be performed quickly. In addition, an effective diameter of a light beam of the first lens unit becomes smaller than that in the front lens focus system. Therefore, the zoom lens can be made compact.

Here, when the zoom lens has a higher aperture ratio, depth of field becomes shallow. Thus it is necessary to make a ratio of an amount of movement of an image forming plane to an amount of movement of the focus lens unit on the optical axis (hereinafter referred to as focus sensitivity) comparatively small. This is because when the focus sensitivity is high, it is necessary to drive the focus lens unit with high accuracy, which makes it difficult to perform drive control of the focus lens unit. On the other hand, when the focus sensitivity is too low, a driving amount of the focus lens unit increases, which makes a drive mechanism of the focus lens unit larger, or makes it difficult to make the zoom lens compact.

In addition, in the rear focus system, an amount of aberration fluctuation at the time of focusing tends to be larger than that in the front lens focus system, and particularly spherical aberration tends to become large when focusing on a near-distance object.

For this reason, in a zoom lens having a large aperture using the rear focus system, it is important to reduce the aberration fluctuation in focusing, while setting the focus sensitivity within an appropriate range.

Accordingly, in the zoom lens according to each exemplary embodiment, the lens unit LN having negative refractive power is provided on the image side of the lens unit LF which moves during focusing. By dividing, in the rear lens group LB, the lens unit into the lens units LF and LN having negative refractive power, the focus sensitivity of the lens unit LF is reduced, and drive control of the focus lens unit is facilitated. Furthermore, by reducing the negative refractive power of the lens unit LF, the aberration fluctuation accompanied by the focusing is reduced.

In addition, in the zoom lens according to each exemplary embodiment, at least one lens unit having positive refractive power is disposed on the image side of the lens unit LN. By disposing the lens unit having positive refractive power on the image side of the lens unit LN, it is possible to lengthen a distance from an exit pupil to the image plane IP at a wide-angle end and obtain good telecentricity. Accordingly, a drop amount of a peripheral light amount can be reduced.

In addition, in the zoom lens according to each exemplary embodiment, a lens unit LP having the largest refractive power, among the lens units disposed on the image side of the lens unit LN and having positive refractive power, is moved to the object side during zooming from the wide-angle end to the telephoto end. With this configuration, an effective diameter of a light beam can be reduced in the lens unit LP at the telephoto end, and the lens unit LP can be made compact. In addition, it is possible to reduce fluctuation of an exit pupil position accompanied by zooming and fluctuation of an incident angle of an off-axis light beam incident on the image pickup element.

Furthermore, in order to complement reduction due to the movement of the lens unit LP to the object side, the lens unit LN is moved to the object side such that a distance between the lens units LP and LN increases during zooming from the wide-angle end to the telephoto end. That is, in the zoom lens according to each exemplary embodiment, the lens units LP and LN are moved to the object side such that the distance therebetween increases during zooming from the wide-angle end to the telephoto end. With this configuration, an amount of burden of zooming of the rear lens group LB can be increased, and a total length of the zoom lens at the telephoto end can be shortened.

Furthermore, the zoom lens according to each exemplary embodiment has a configuration that satisfies the following Expression (1):

$$0.36 < |fLF/fLP| < 1.30 \qquad (1)$$

where fLF is a focal length of the lens unit LF and fLP is a focal length of the lens unit LP.

Expression (1) relates to a ratio of the focal length of the lens unit LF serving as the focus lens unit to the focal length of the lens unit LP. By satisfying Expression (1), the distance from the exit pupil to the image plane IP at the wide-angle end can be lengthened, while facilitating drive control of the focus lens unit.

When the refractive power of the lens unit LF becomes so small that the value of |fLF/fLP| exceeds an upper limit value of Expression (1), the focus sensitivity becomes too small. In this case, an amount of movement of the lens unit LF necessary for focusing at a desired object distance becomes too large, and particularly it becomes difficult to shorten the total length at the telephoto end. Alternatively, the refractive power of the lens unit LP becomes too large, and it becomes difficult to correct curvature of field and distortion aberration at the wide-angle end.

On the other hand, when the refractive power of the lens unit LF becomes so large that the value of |fLF/fLP| falls below a lower limit value of Expression (1), the focus sensitivity becomes too large, and it becomes difficult to perform drive control of the lens unit LF during focusing. Alternatively, the refractive power of the lens unit LP becomes too small, and it becomes difficult to sufficiently lengthen the distance from the exit pupil to the image plane IP at the wide-angle end.

Furthermore, the zoom lens according to each exemplary embodiment desirably satisfies the following Expression (2):

$$0.2<|fLF/ft|<1.0 \quad (2)$$

where ft is a focal length of the zoom lens at the telephoto end.

Expression (2) appropriately sets the focal length of the lens unit LF. By satisfying Expression (2), good optical performance can be obtained, while making the lens unit LF compact.

When the refractive power of the lens unit LF becomes so small that the value of |fLF/ft| exceeds an upper limit value of Expression (2), the focus sensitivity becomes too small. In this case, the amount of movement of the lens unit LF necessary for focusing at a desired object distance becomes too large, and the drive mechanism of the focus lens unit becomes larger in size. In addition, when the refractive power of the lens unit LF becomes so large that the value of |fLF/ft| falls below a lower limit value of Expression (2), it becomes difficult to correct axial chromatic aberration and spherical aberration. In addition, the focus sensitivity becomes too large, and it becomes difficult to perform drive control of the lens unit LF with high accuracy during focusing.

In addition, the zoom lens according to each exemplary embodiment desirably satisfies the following Conditional Expression (3):

$$1.0<fLP/fw<7.0 \quad (3)$$

where fw is a focal length of the zoom lens at the wide-angle end.

Expression (3) appropriately sets the focal length of the lens unit LP. By satisfying Expression (3), the distance from the exit pupil to the image plane IP at the wide-angle end can be sufficiently lengthened.

When the refractive power of the lens unit LP becomes so small that the value of fLP/fw exceeds an upper limit value of Expression (3), it becomes difficult to sufficiently lengthen the distance from the exit pupil to the image plane IP at the wide-angle end. In addition, when the refractive power of the lens unit LP becomes so large that the value of fLP/fw falls below a lower limit value of Expression (3), it becomes difficult to correct curvature of field and distortion aberration at the wide-angle end.

Furthermore, the zoom lens according to each exemplary embodiment desirably satisfies the following Expression (4) where mLP is an amount of movement of the lens unit LP accompanied during zooming from the wide-angle end to the telephoto end, and ft is the focal length of the zoom lens at the telephoto end. Note that the sign mLP is positive in a case where the lens unit LP moves from the image side to the object side.

$$0.05<mLP/ft<0.50 \quad (4)$$

Expression (4) appropriately sets the amount of movement of the lens unit LP accompanied by zooming from the wide-angle end to the telephoto end. By satisfying Expression (4), fluctuation of the exit pupil position accompanied by zooming can be reduced, while making the zoom lens compact.

When mLP becomes so large that the value of mLP/ft exceeds an upper limit value of Expression (4), the total length of the zoom lens at the telephoto end becomes too long.

On the other hand, when mLP becomes so small that the value of mLP/ft falls below a lower limit value of Expression (4), a position of the lens unit LP at the telephoto end becomes too close to the image plane IP, and as a result, a diameter of the lens unit LP becomes too large. In addition, an amount of the fluctuation of the exit pupil position accompanied by zooming becomes large.

In addition, the zoom lens according to each exemplary embodiment desirably satisfies the following Conditional Expression (5) where dw is a distance between the lens units LN and LP at the wide-angle end, and dt is a distance between the lens units LN and LP at the telephoto end. Note that the distance between the lens units LN and LP is a distance on the optical axis from a lens surface closest to the image side of the lens unit LN to a lens surface closest to the object side of the lens unit LP.

$$0.05<(dt-dw)/ft<0.50 \quad (5)$$

Expression (5) appropriately sets an amount of change of the distance between the lens units LN and LP at the wide-angle end and the distance between the lens units LN and LP at the telephoto end. By satisfying Expression (5), burden of zooming on the lens units LN and LP can be increased during zooming from the wide-angle end to the telephoto end, and the total length of the zoom lens at the telephoto end can be shortened.

When the amount of change of the distance between the lens units LN and LP at the wide-angle end and the distance between the lens units LN and LP at the telephoto end becomes so large as to exceed an upper limit value of Expression (5), the total length of the zoom lens at the telephoto end becomes too long. In addition, the amount of the fluctuation of the exit pupil position accompanied by zooming becomes large. On the other hand, when the amount of change falls below a lower limit value of Expression (5), it becomes difficult to secure appropriate magnification of the lens units LN and LP during zooming from the wide-angle end to the telephoto end, and burden of zooming on other lens units becomes large. In this case, since refractive power of the other lens units becomes large, it becomes difficult to correct spherical aberration and curvature of field.

In addition, the zoom lens according to each exemplary embodiment desirably satisfies the following Expression (6) where βrw is composite lateral magnification of the lens unit disposed on the image side of the lens unit LN at the wide-angle end, and βrt is composite lateral magnification of the lens unit disposed on the image side of the lens unit LN at the telephoto end. Note that in a case where there is only one lens unit disposed on the image side of the lens unit LN, βrw is lateral magnification of the lens unit at the wide-angle end, and βrt is lateral magnification at the telephoto end.

$$1.0 < |βrt/βrw| < 2.0 \quad (6)$$

Expression (6) appropriately sets burden of zooming on the lens unit disposed on the image side of the lens unit LN. By satisfying Expression (6), magnification can be increased by the lens unit disposed on the image side of the lens unit LN during zooming from the wide-angle end to the telephoto end, and the total length of the zoom lens at the telephoto end can be shortened.

When the value of $|βrt/βrw|$ exceeds an upper limit value of Expression (6), the burden of zooming of the lens unit disposed on the image side of the lens unit LN becomes too large, and it becomes difficult to correct distortion aberration and curvature of field at the wide-angle end. On the other hand, when value of $|βrt/βrw|$ falls below a lower limit value of Expression (6), the burden of zooming becomes too small, and burden of zooming on other lens units becomes large. Therefore, refractive power of the other lens units becomes too large, and it becomes difficult to correct spherical aberration and curvature of field.

In addition, the zoom lens according to each exemplary embodiment desirably satisfies the following Conditional Expression (7):

$$0.8 < |(1-βLFt^2) \times βrt^2/Fnot| < 2.0 \quad (7)$$

where βLFt is lateral magnification of the lens unit LF at the telephoto end, βrt is composite lateral magnification of the lens unit disposed on the image side of the lens unit LN at the telephoto end, and Fnot is an F-number at the telephoto end.

Expression (7) appropriately sets a ratio of the focus sensitivity of the focus lens unit LF to the F-number at the telephoto end. In the zoom lens having a large aperture, it is necessary to perform drive control of the focus lens unit with high accuracy. By satisfying Expression (7), the focus sensitivity can be reduced, and drive control of the lens unit LF serving as the focus lens unit can be more easily performed.

When the value of $|(1-βLFt^2) \times βrt^2/Fnot|$ exceeds an upper limit value of Expression (7), the focus sensitivity becomes too large, and it becomes difficult to perform drive control of the lens unit LF with high accuracy during focusing. On the other hand, when the value of $|(1-βLFt^2) \times βrt^2/Fnot|$ falls below a lower limit value of Expression (7), the focus sensitivity becomes too small, an amount of movement of the lens unit LF necessary for focusing at a desired in-focus distance becomes too large, and it becomes difficult to shorten the total length of the zoom lens at the telephoto end.

In addition, the zoom lens according to each exemplary embodiment desirably satisfies the following Expression (8):

$$1.0 < (r1+r2)/(r1-r2) < 3.0 \quad (8)$$

where r1 is a curvature radius of a lens surface closest to the object side of the lens unit LF and r2 is a curvature radius of a lens surface closest to the image side.

Expression (8) appropriately sets a shape of the lens unit LF. By satisfying Expression (8), it is possible to make the shape of the lens unit LF serving as the focus lens unit to be a shape having a surface which is nearly concentric with respect to the image plane IP. With this configuration, an on-axis light flux passes through the lens unit LF without being greatly refracted, and accordingly, an amount of spherical aberration generated in the lens unit LF can be reduced. Therefore, fluctuation of spherical aberration due to focusing on the telephoto side can be suppressed.

In addition, the zoom lens according to each exemplary embodiment desirably satisfies the following Expression (9):

$$0.5 < fLF/fLN < 1.5 \quad (9)$$

where fLN is a focal length of the lens unit LN.

Expression (9) defines an appropriate range of a value of a ratio of a focal length of the focus lens unit LF to the focal length of the lens unit LN. By satisfying Expression (9), good optical performance can be obtained, while making the lens unit LF compact.

When the refractive power of the lens unit LF becomes so small that the value of fLF/fLN exceeds an upper limit value of Expression (9), the amount of movement of the lens unit LF necessary for focusing at a desired in-focus distance becomes large, and an amount of aberration fluctuation accompanied by focusing becomes large. In addition, the drive mechanism of the focus lens unit becomes larger in size. Alternatively, the refractive power of the lens unit LN becomes too large, and it becomes difficult to sufficiently lengthen the distance from the exit pupil to the image plane IP at the wide-angle end.

On the other hand, when the refractive power of the lens unit LF becomes so large that the value of fLF/fLN falls below a lower limit value of Expression (9), it becomes difficult to correct axial chromatic aberration and spherical aberration.

In addition, the zoom lens according to each exemplary embodiment desirably satisfies the following Expression (10):

$$0.3 < f1/ft < 2.0 \quad (10)$$

where f1 is a focal length of the first lens unit L1.

Expression (10) defines an appropriate range of the focal length of the first lens unit L1. When the value of f1/ft exceeds an upper limit value of Expression (10), an amount of movement of the first lens unit L1 accompanied by zooming from the wide-angle end to the telephoto end becomes large, and it becomes difficult to shorten the total length of the zoom lens at the telephoto end. On the other hand, when the value of f1/ft falls below a lower limit value of Expression (10), although it is advantageous for increasing zoom ratio, the refractive power of the first lens unit L1 becomes too large, and it becomes difficult to correct spherical aberration at the telephoto end.

In addition, the zoom lens according to each exemplary embodiment desirably satisfies the following Expression (11):

$$0.5 < |f2/fw| < 1.5 \quad (11)$$

where f2 is a focal length of the second lens unit L2.

Expression (11) defines an appropriate range of the focal length of the second lens unit L2.

When the refractive power of the second lens unit L2 becomes so small that the value of |f2/fw| exceeds an upper limit value of Expression (11), it becomes difficult to attain a refractive power disposition of a retrofocus type at the wide-angle end, and an angle of view of the zoom lens at the wide-angle end becomes narrow.

On the other hand, when the refractive power of the second lens unit L2 becomes so large that the value of |f2/fw| falls below a lower limit value of Expression (11), an amount of fluctuation of spherical aberration and lateral chromatic aberration accompanied by zooming becomes large. In addition, in this case, since a diverging effect of the on-axis light flux by the second lens unit becomes too large, it becomes difficult to make the rear lens group LB compact.

Note that numerical ranges of the above-described Expressions (1) to (11) are more desirably in the ranges of the following Expressions (1a) to (11a).

$$0.40<|fLF/fLP|<1.15 \quad (1a)$$

$$0.2<|fLF/ft|<0.8 \quad (2a)$$

$$1.5<fLP/fw<6.5 \quad (3a)$$

$$0.1<mLP/ft<0.4 \quad (4a)$$

$$0.05<(dt-dw)/ft<0.40 \quad (5a)$$

$$1.1<|\beta rt/\beta rw|<1.7 \quad (6a)$$

$$1.0<|(1-\beta LFt^2)\times\beta rt^2/Fnot|<1.9 \quad (7a)$$

$$1.3<(r1+r2)/(r1-r2)<2.5 \quad (8a)$$

$$0.6<fLF/fLN<1.2 \quad (9a)$$

$$0.35<f1/ft<1.70 \quad (10a)$$

$$0.6<|f2/fw|<1.2 \quad (11a)$$

In addition, the numerical ranges of the above-described Expressions (1) to (11) are more desirably in the ranges of the following Expressions (1b) to (11b).

$$0.50<|fLF/fLP|<1.0 \quad (1b)$$

$$0.2<|fLF/ft|<0.7 \quad (2b)$$

$$2.0<fLP/fw<5.0 \quad (3b)$$

$$0.10<mLP/ft<0.30 \quad (4b)$$

$$0.06<(dt-dw)/ft<0.30 \quad (5b)$$

$$1.12<|\beta rt/\beta rw|<1.50 \quad (6b)$$

$$1.1<|(1-\beta LFt^2)\times\beta rt^2/Fnot|<1.8 \quad (7b)$$

$$1.4<(r1+r2)/(r1-r2)<2.3 \quad (8b)$$

$$0.7<fLF/fLN<1.1 \quad (9b)$$

$$0.5<f1/ft<1.6 \quad (10b)$$

$$0.7<|f2/fw|<1.1 \quad (11b)$$

Furthermore, the lens unit LN is desirably disposed adjacent to the image side of the lens unit LF. By disposing the lens units LN and LF adjacent to each other, the total length of the zoom lens can be shortened.

In addition, the lens unit LF desirably includes one negative lens. With this configuration, the lens unit LF can be made compact and the total length of the zoom lens can be made short. In addition, since the lens unit LF can be made lightweight, focusing can be performed quickly.

In addition, the lens unit LN desirably includes one negative lens. With this configuration, the lens unit LN can be made compact and the total length of the zoom lens can be made short. In addition, the lens unit LP desirably includes one positive lens. With this configuration, the lens unit LP can be made compact and the total length of the zoom lens can be made short.

Next, the zoom lens according to each exemplary embodiment will be described in detail.

A zoom lens according to a first exemplary embodiment has a six-unit configuration. The zoom lens includes a first lens unit L1 having positive refractive power, a second lens unit L2 having negative refractive power, and a rear lens group LB having positive refractive power. The rear lens group LB includes a third lens unit L3 having positive refractive power, a fourth lens unit L4 having negative refractive power, a fifth lens unit L5 having negative refractive power, and a sixth lens unit L6 having positive refractive power. A cross-sectional view of the lens is as illustrated in FIG. 1.

In the zoom lens according to the first exemplary embodiment, the fourth lens unit L4 corresponds to the above-described lens unit LF, and moves to the image side during focusing from infinity to a short distance. The fifth lens unit L5 is disposed on the image side of the fourth lens unit L4 (lens unit LF), and corresponds to the above-described lens unit LN. The sixth lens unit L6 has the strongest refractive power among the lens units disposed on the image side of the fifth lens unit L5 (lens unit LN) and having positive refractive power, and corresponds to the above-described lens unit LP.

In the zoom lens according to the first exemplary embodiment, the first lens unit L1 moves to the object side during zooming from the wide-angle end to the telephoto end. The second lens unit L2 moves to the object side such that a distance between the first lens unit L1 and the second lens unit L2 increases. The third lens unit L3 moves to the object side such that a distance between the second lens unit L2 and the third lens unit L3 decreases. The fourth lens unit L4 moves to the object side such that a distance between the third lens unit L3 and the fourth lens unit L4 decreases. The fifth lens unit L5 moves to the object side such that a distance between the fourth lens unit L4 and the fifth lens unit L5 increases. The sixth lens unit L6 moves to the object side such that a distance between the fifth lens unit L5 and the sixth lens unit L6 increases.

Figure 2A:
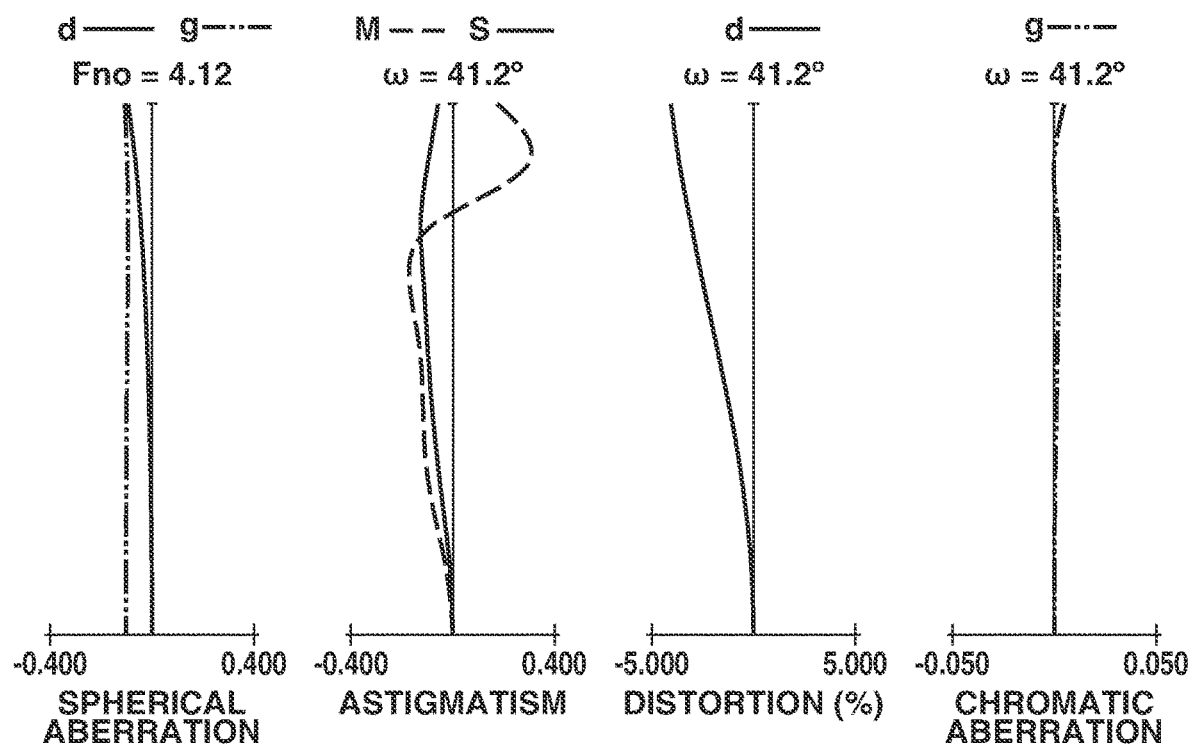
FIGS. 2A and 2B are aberration diagrams of the zoom lens according to the first exemplary embodiment when focusing at infinity.
Figure 2B:
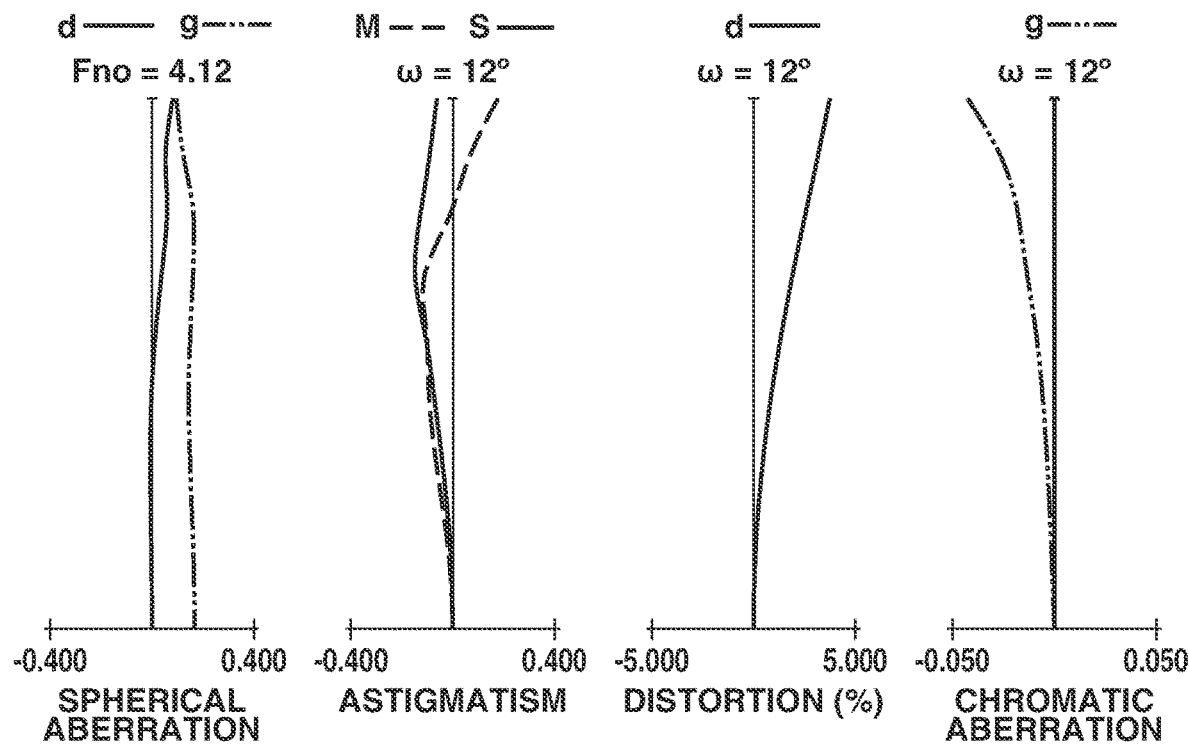
Figure 3A:
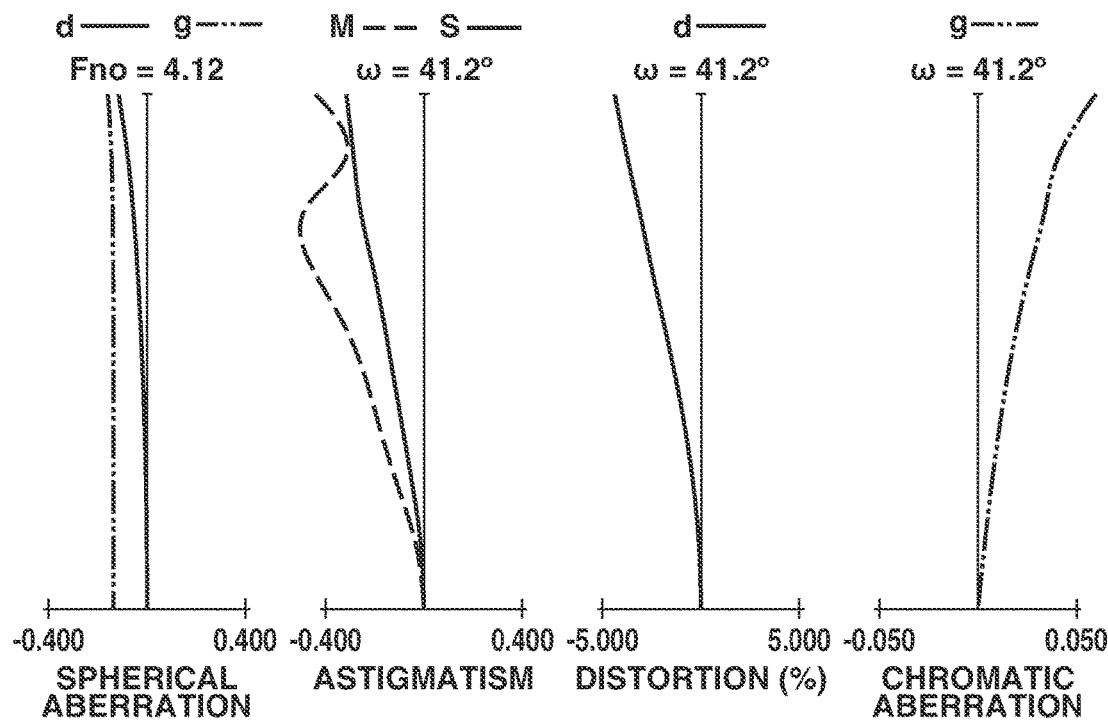
FIGS. 3A and 3B are aberration diagrams of the zoom lens according to the first exemplary embodiment when focusing on an object at an object distance of 0.45 m.
Figure 3B:
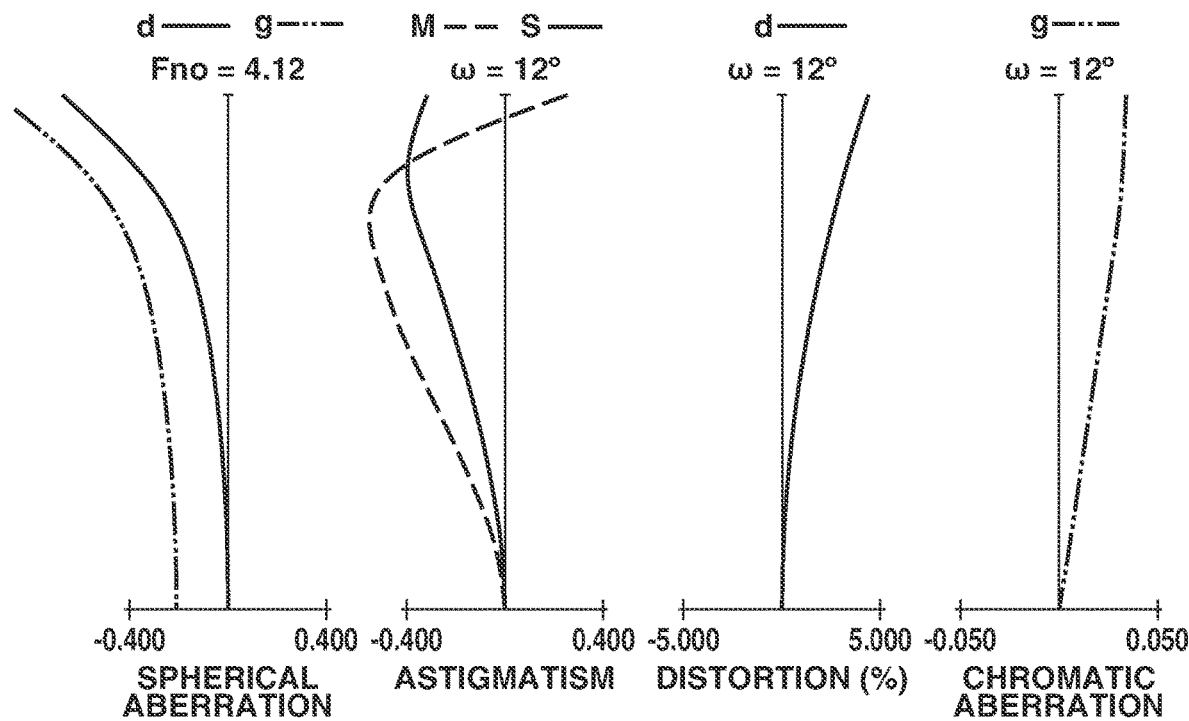

FIGS. 2A and 2B are aberration diagrams of the zoom lens according to the first exemplary embodiment when focusing at infinity at the wide-angle end and the telephoto end. In addition, FIGS. 3A and 3B are aberration diagrams of the zoom lens according to the first exemplary embodiment when focusing on an object at an object distance of 0.45 m at the wide-angle end and the telephoto end.

In each aberration diagram, Fno is an F-number, and ω is a half angle of view (degrees). In a spherical aberration diagram, d (solid line) is a d line (wavelength of 587.6 nm) and g (two-dot chain line) is a g line (wavelength of 435.8 nm). In an astigmatism diagram, S (solid line) is a sagittal image plane at the d line and M (broken line) is a meridional image plane at the d line. A distortion aberration diagram illustrates distortion aberration for the d line. A lateral chromatic aberration diagram illustrates lateral chromatic aberration for the g line.

A zoom lens according to a second exemplary embodiment has a six-unit configuration. The zoom lens includes a first lens unit L1 having positive refractive power, a second lens unit L2 having negative refractive power, and a rear lens group LB having positive refractive power. The rear lens group LB includes a third lens unit L3 having positive refractive power, a fourth lens unit L4 having negative refractive power, a fifth lens unit L5 having negative refractive power, and a sixth lens unit L6 having positive refractive power. A cross-sectional view of the zoom lens according to the present exemplary embodiment is as illustrated in FIG. 4.

In the zoom lens according to the second exemplary embodiment, the fourth lens unit L4 corresponds to the above-described lens unit LF, and moves to the image side during focusing from infinity to a short distance. The fifth lens unit L5 is disposed on the image side of the fourth lens unit L4 (lens unit LF), and corresponds to the above-described lens unit LN. The sixth lens unit L6 has the strongest refractive power among the lens units disposed on the image side of the fifth lens unit L5 (lens unit LN) and having positive refractive power, and corresponds to the above-described lens unit LP.

In the zoom lens according to the second exemplary embodiment, the first lens unit L1 moves to the object side during zooming from the wide-angle end to the telephoto end. The second lens unit L2 moves to the object side such that a distance between the first lens unit L1 and the second lens unit L2 increases. The third lens unit L3 moves to the object side such that a distance between the second lens unit L2 and the third lens unit L3 decreases. The fourth lens unit L4 moves to the object side such that a distance between the third lens unit L3 and the fourth lens unit L4 decreases. The fifth lens unit L5 moves to the object side such that a distance between the fourth lens unit L4 and the fifth lens unit L5 increases. The sixth lens unit L6 moves to the object side such that a distance between the fifth lens unit L5 and the sixth lens unit L6 increases.

Figure 5A:
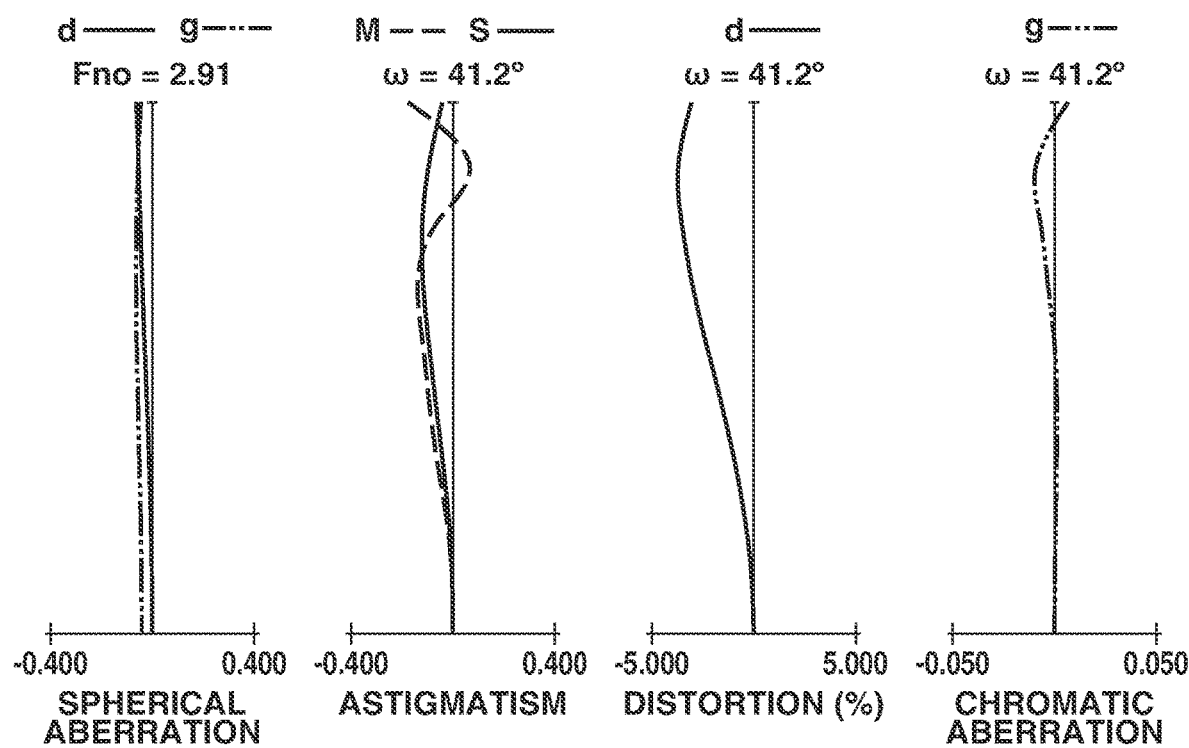
FIGS. 5A and 5B are aberration diagrams of the zoom lens according to the second exemplary embodiment when focusing at infinity.
Figure 5B:
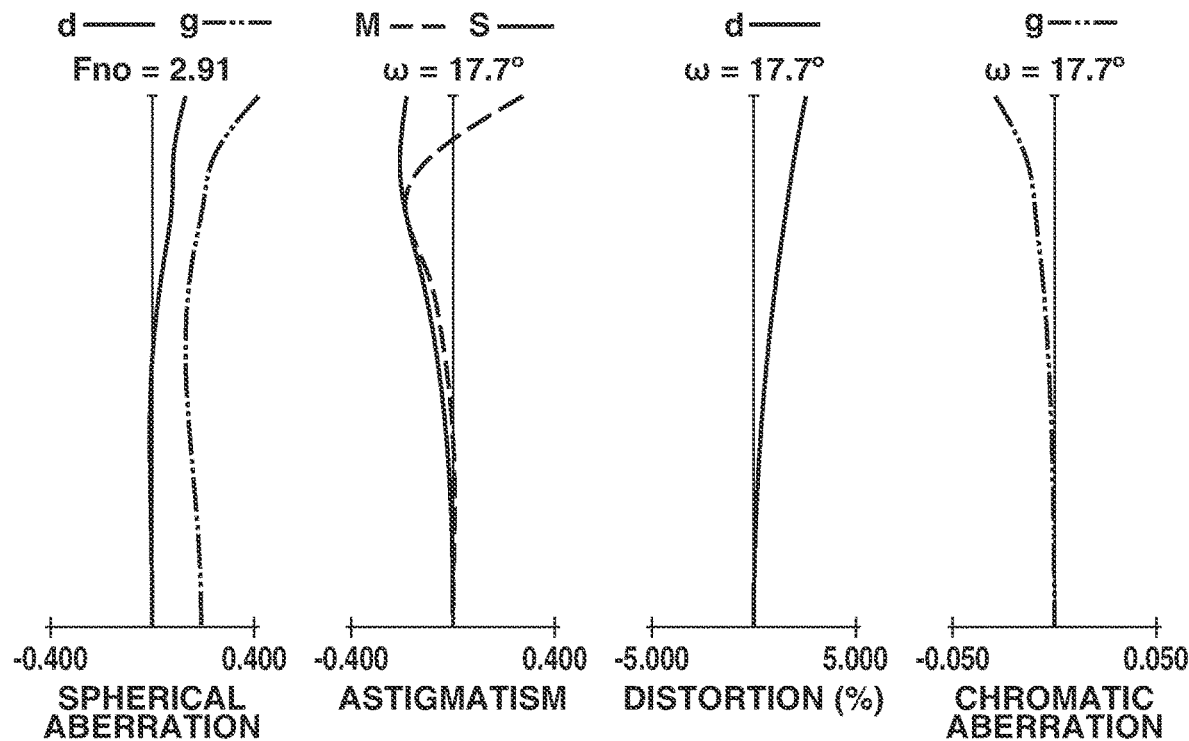
Figure 6A:
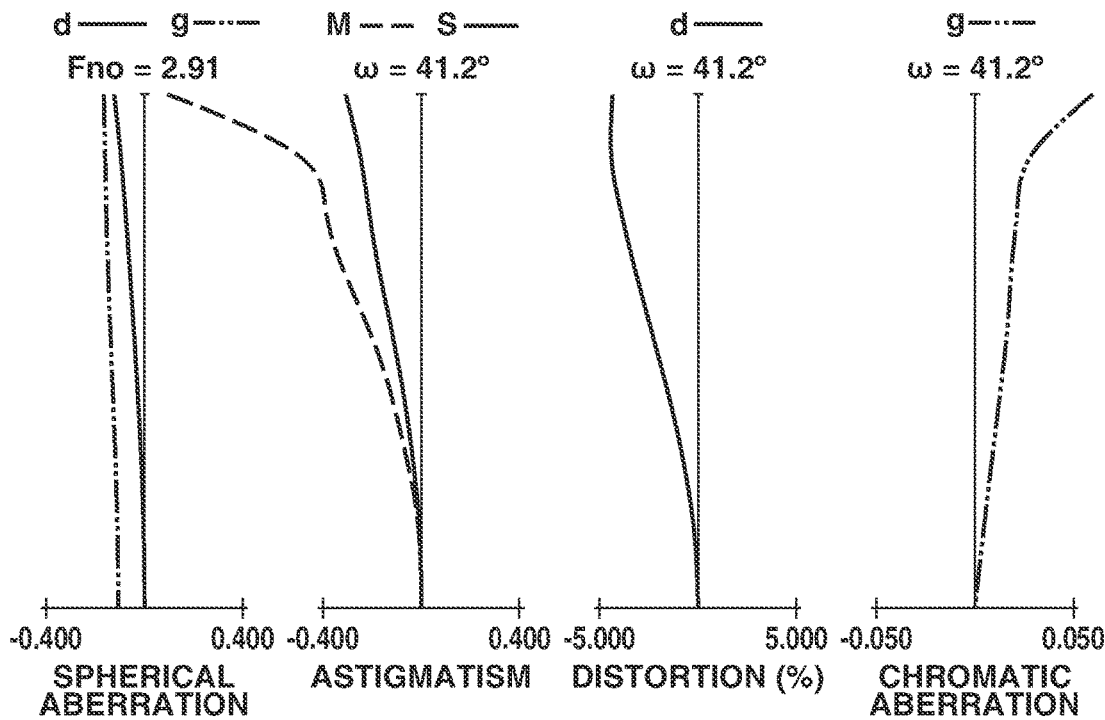
FIGS. 6A and 6B are aberration diagrams of the zoom lens according to the second exemplary embodiment when focusing on an object at an object distance of 0.38 m.
Figure 6B:
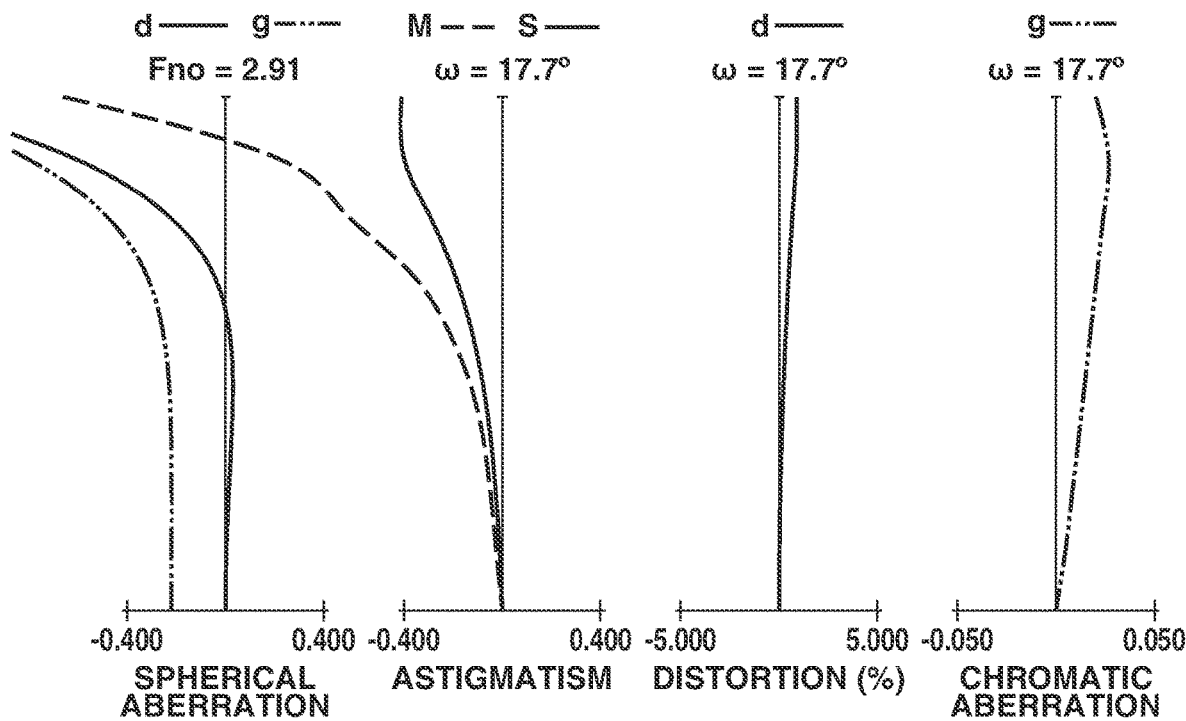

FIGS. 5A and 5B are aberration diagrams of the zoom lens according to the second exemplary embodiment when focusing at infinity at the wide-angle end and the telephoto end. In addition, FIGS. 6A and 6B are aberration diagrams of the zoom lens according to the second exemplary embodiment when focusing on an object at an object distance of 0.38 m at the wide-angle end and the telephoto end.

Figure 7:
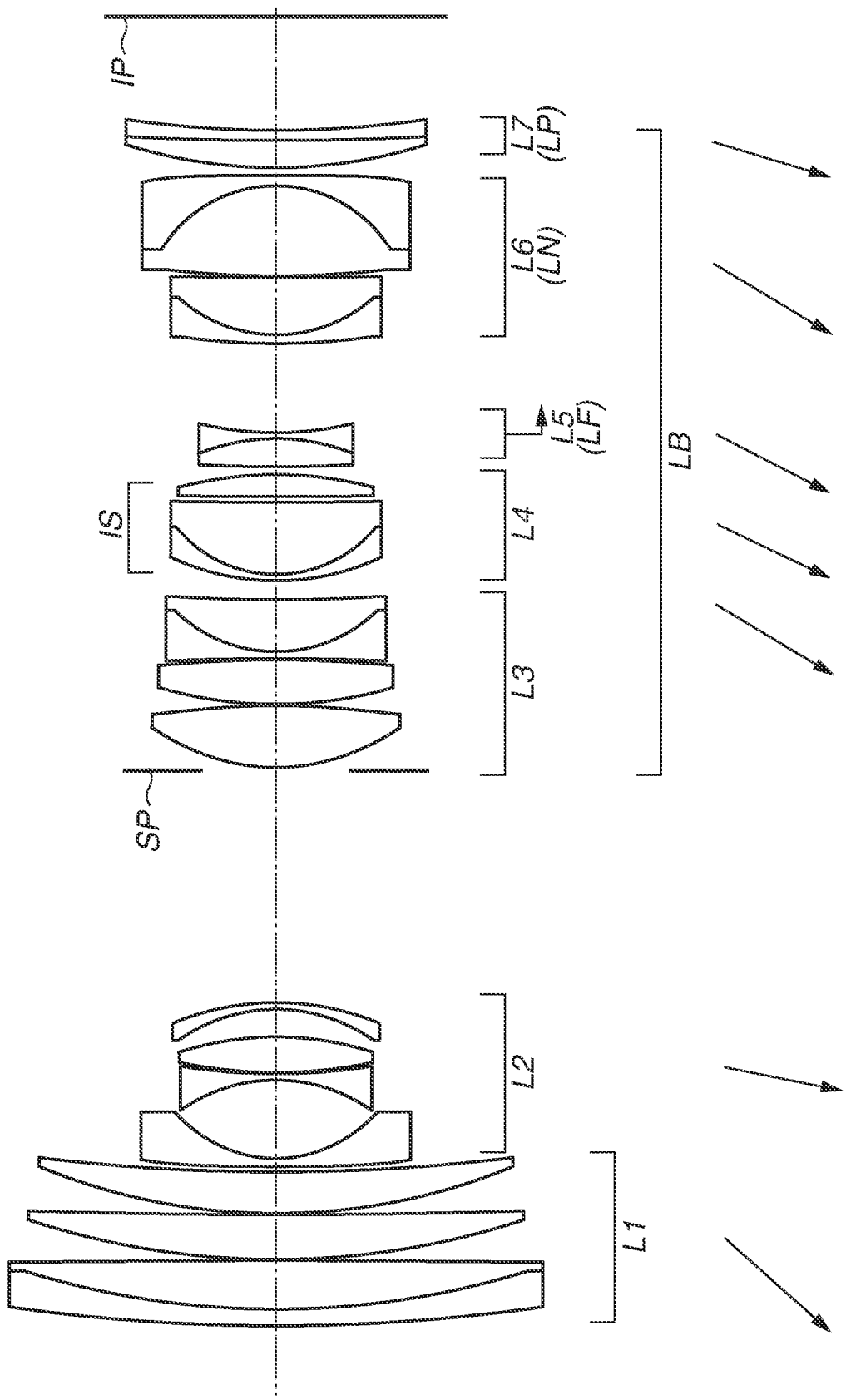
FIG. 7 is a cross-sectional view of a zoom lens according to a third exemplary embodiment when focusing at infinity at a wide-angle end.

A zoom lens according to a third exemplary embodiment has a seven-unit configuration. The zoom lens includes a first lens unit L1 having positive refractive power, a second lens unit L2 having negative refractive power, and a rear lens group LB having positive refractive power. The rear lens group LB includes a third lens unit L3 having positive refractive power, a fourth lens unit L4 having positive refractive power, a fifth lens unit L5 having negative refractive power, a sixth lens unit L6 having negative refractive power, and a seventh lens unit L7 having positive refractive power. A cross-sectional view of the zoom lens according to the present exemplary embodiment is as illustrated in FIG. 7.

In the zoom lens according to the third exemplary embodiment, the fifth lens unit L5 corresponds to the above-described lens unit LF, and moves to the image side during focusing from infinity to a short distance. The sixth lens unit L6 is disposed on the image side of the fifth lens unit L5 (lens unit LF), and corresponds to the above-described lens unit LN. The seventh lens unit L7 has the strongest refractive power among the lens units disposed on the image side of the sixth lens unit L6 (lens unit LN) and having positive refractive power, and corresponds to the above-described lens unit LP.

In the zoom lens according to the third exemplary embodiment, the first lens unit L1 moves to the object side during zooming from the wide-angle end to the telephoto end. The second lens unit L2 moves to the object side such that a distance between the first lens unit L1 and the second lens unit L2 increases. The third lens unit L3 moves to the object side such that a distance between the second lens unit L2 and the third lens unit L3 decreases. The fourth lens unit L4 moves to the object side such that a distance between the third lens unit L3 and the fourth lens unit L4 decreases. The fifth lens unit L5 moves to the object side such that a distance between the fourth lens unit L4 and the fifth lens unit L5 increases. The sixth lens unit L6 moves to the object side such that a distance between the fifth lens unit L5 and the sixth lens unit L6 increases. The seventh lens unit L7 moves to the object side such that a distance between the sixth lens unit L6 and the seventh lens unit L7 increases.

Figure 8A:
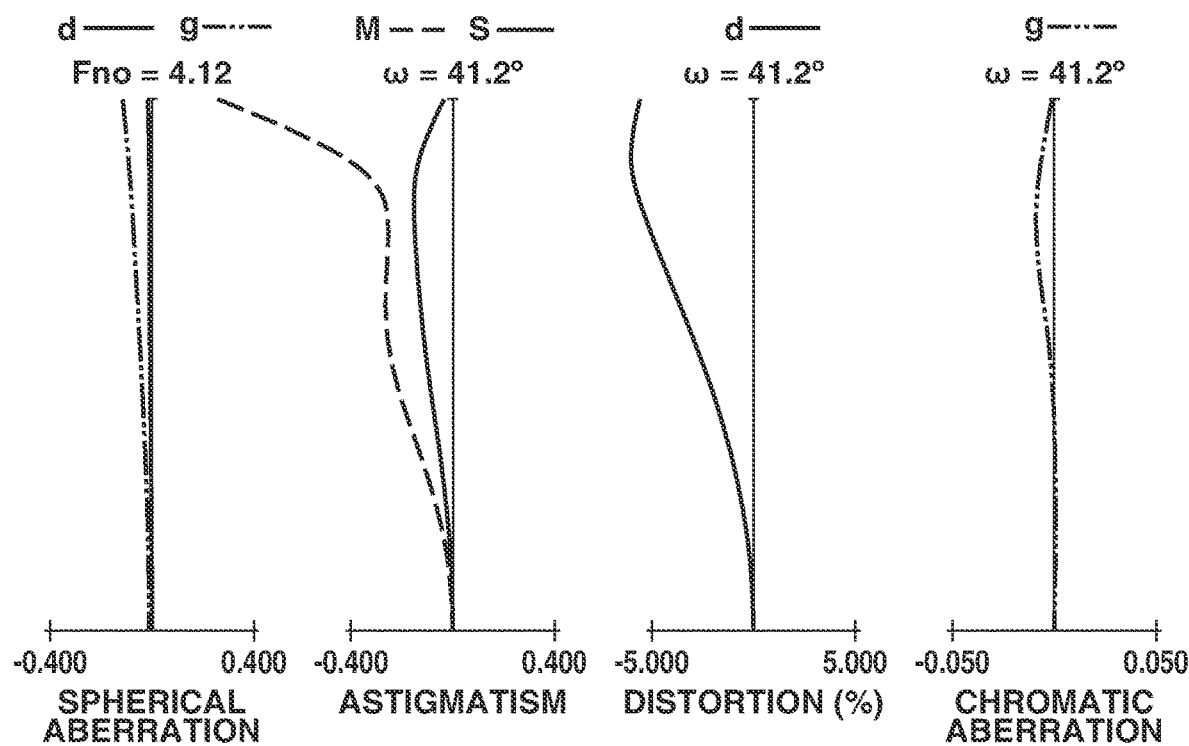
FIGS. 8A and 8B are aberration diagrams of the zoom lens according to the third exemplary embodiment when focusing at infinity.
Figure 8B:
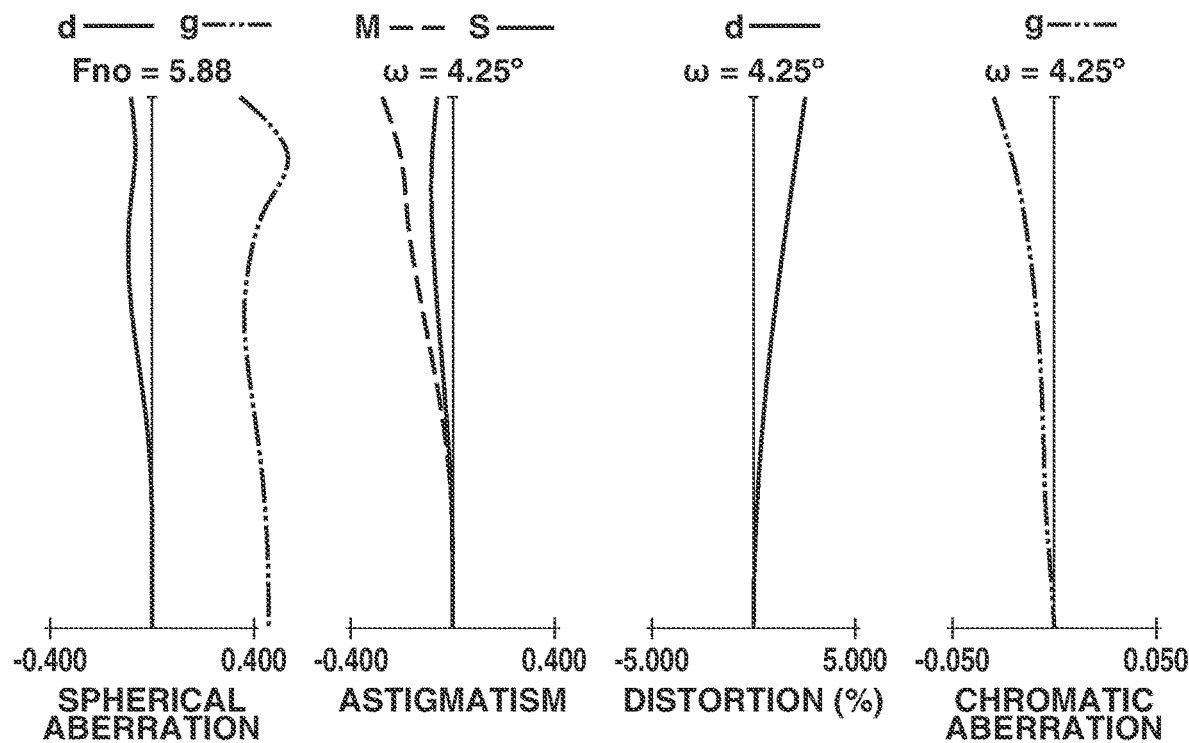
Figure 9A:
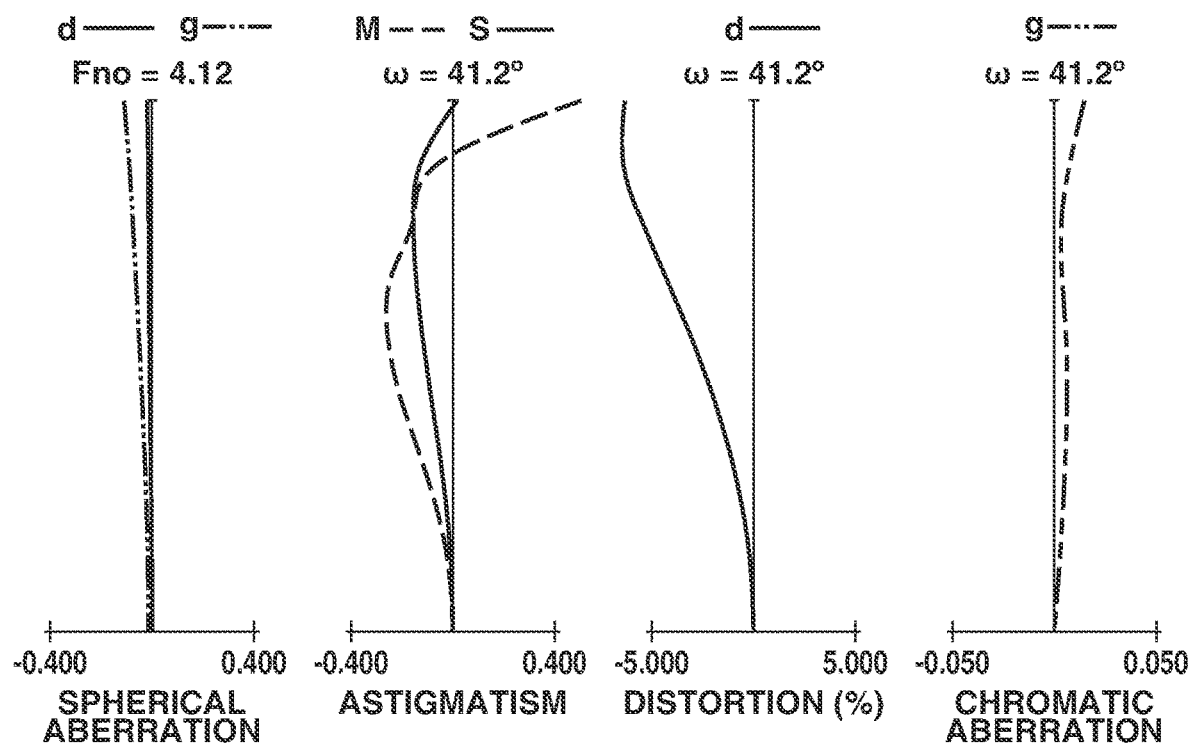
FIGS. 9A and 9B are aberration diagrams of the zoom lens according to the third exemplary embodiment when focusing on an object at an object distance of 0.70 m.
Figure 9B:
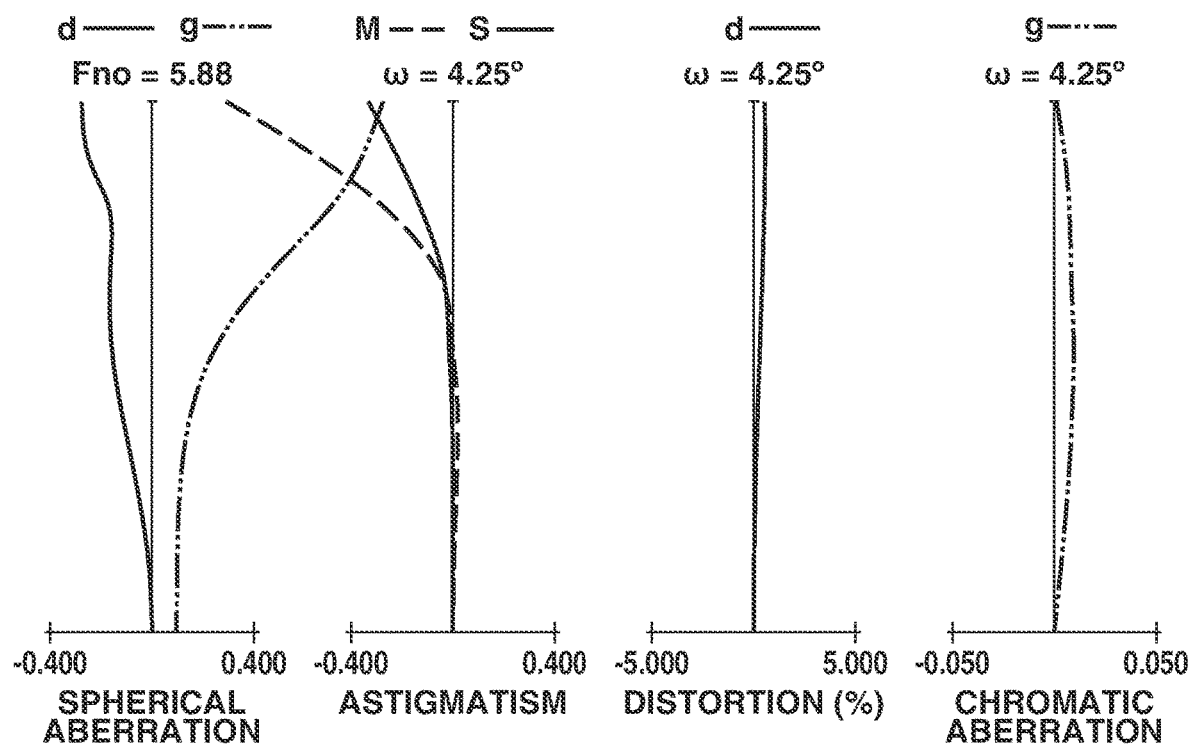

FIGS. 8A and 8B are aberration diagrams of the zoom lens according to the third exemplary embodiment when focusing at infinity at the wide-angle end and the telephoto end. In addition, FIGS. 9A and 9B are aberration diagrams of the zoom lens according to the third exemplary embodiment when focusing on an object at an object distance of 0.70 m at the wide-angle end and the telephoto end.

A zoom lens according to a fourth exemplary embodiment has a seven-unit configuration. The zoom lens includes a first lens unit L1 having positive refractive power, a second lens unit L2 having negative refractive power, and a rear lens group LB having positive refractive power. The rear lens group LB includes a third lens unit L3 having positive refractive power, a fourth lens unit L4 having negative refractive power, a fifth lens unit L5 having negative refractive power, a sixth lens unit L6 having positive refractive power, and a seventh lens unit L7 having positive refractive power. A cross-sectional view of the zoom lens according to the present exemplary embodiment is as illustrated in FIG. 10.

In the zoom lens according to the fourth exemplary embodiment, the fourth lens unit L4 corresponds to the above-described lens unit LF, and moves to the image side during focusing from infinity to a short distance. The fifth lens unit L5 is disposed on the image side of the fourth lens unit L4 (lens unit LF), and corresponds to the above-described lens unit LN. The sixth lens unit L6 has the strongest refractive power among the lens units disposed on the image side of the fifth lens unit L5 (lens unit LN) and having positive refractive power, and corresponds to the above-described lens unit LP.

In the zoom lens according to the fourth exemplary embodiment, the first lens unit L1 moves to the object side during zooming from the wide-angle end to the telephoto end. The second lens unit L2 moves to the object side such that a distance between the first lens unit L1 and the second lens unit L2 increases. The third lens unit L3 moves to the object side such that a distance between the second lens unit L2 and the third lens unit L3 decreases. The fourth lens unit L4 moves to the object side such that a distance between the third lens unit L3 and the fourth lens unit L4 decreases. The fifth lens unit L5 moves to the object side such that a distance between the fourth lens unit L4 and the fifth lens unit L5 increases. The sixth lens unit L6 moves to the object side such that a distance between the fifth lens unit L5 and the sixth lens unit L6 increases. In addition, the seventh lens unit L7 does not move during zooming.

Figure 11A:
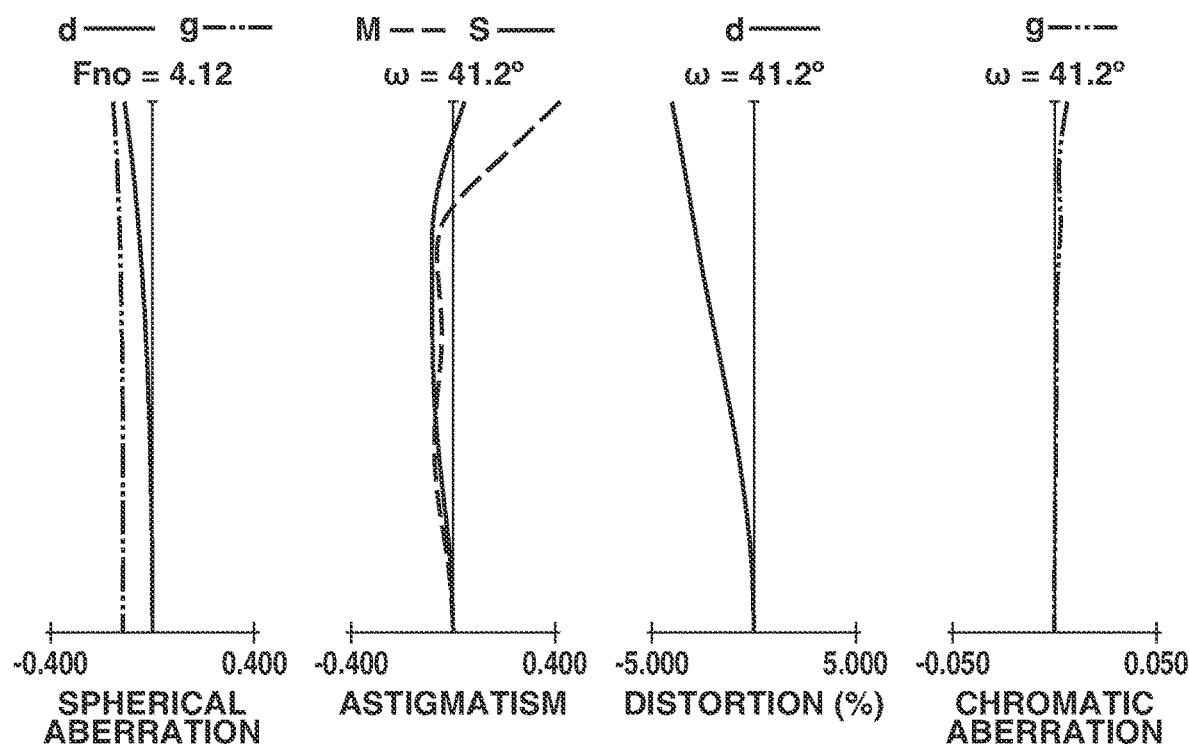
FIGS. 11A and 11B are aberration diagrams of the zoom lens according to the fourth exemplary embodiment when focusing at infinity.
Figure 11B:
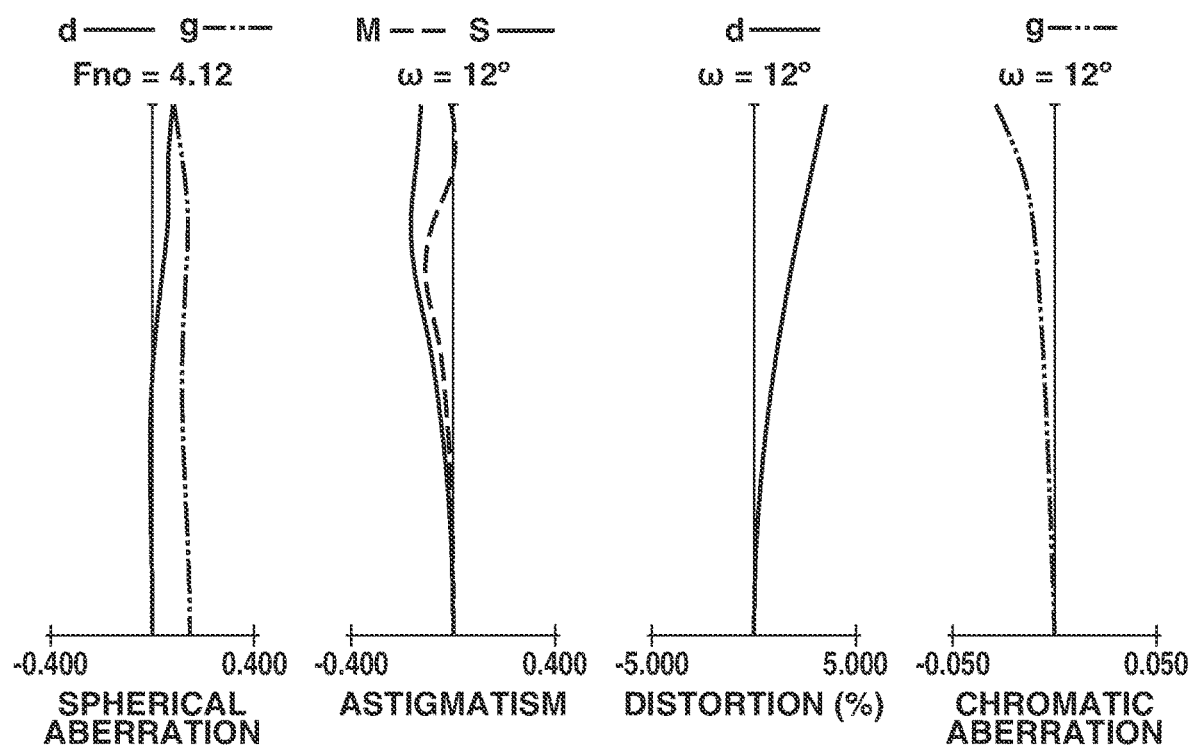
Figure 12A:
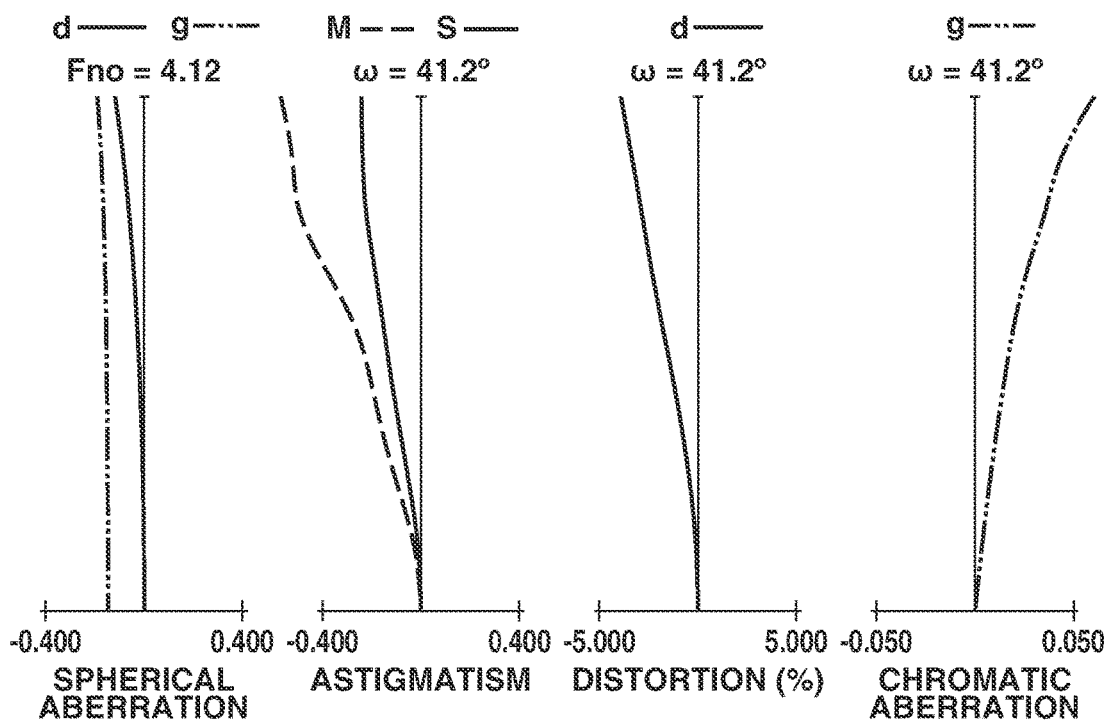
FIGS. 12A and 12B are aberration diagrams of the zoom lens according to the fourth exemplary embodiment when focusing on an object at an object distance of 0.45 m.
Figure 12B:
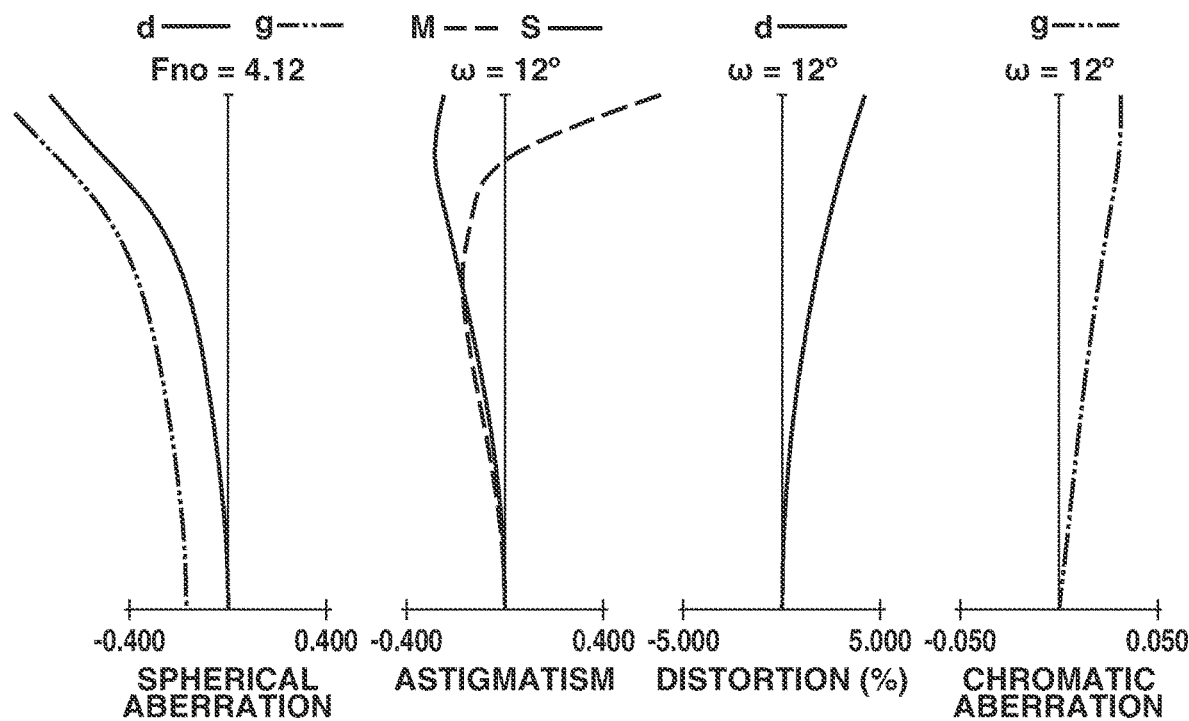

FIGS. 11A and 11B are aberration diagrams of the zoom lens according to the fourth exemplary embodiment when focusing at infinity at the wide-angle end and the telephoto end. In addition, FIGS. 12A and 12B are aberration diagrams of the zoom lens according to the fourth exemplary embodiment when focusing on an object at an object distance of 0.45 m at the wide-angle end and the telephoto end.

Next, Numerical Examples 1 to 4 respectively corresponding to the zoom lenses according to the above-described first to fourth exemplary embodiments are shown.

In surface data of each Numerical Example, r is a curvature radius of each lens surface, and d (mm) is an axial distance (a distance on the optical axis) between an m-th surface and an (m+1)th surface. Note that m is a surface number when counted from a light incidence side. In addition, nd is a refractive index of each optical member with respect to the d line, and νd is an Abbe number of the optical member. The Abbe number νd is a value defined by the following Expression (12):

$$\nu d = (nd-1)/(nF-nC) \quad (12)$$

where ng, nF, nd, and nC are refractive indices to the g line, F line, d line, and C line of the Fraunhofer line, respectively.

In the surface data of each Numerical Example, a sign of * (asterisk) is added after the surface number for an aspheric lens surface. In addition, in aspheric surface data, an aspheric coefficient of each aspheric surface is shown. In the aspheric coefficient, "e±Z" means "×10$^{\pm z}$". An aspheric shape of the lens surface is represented by the following Expression (13):

$$X = \frac{\frac{R^2}{R}}{1+\sqrt{1-(1+K)\left(\frac{H}{R}\right)^2}} + A4H^4 + A6H^6 + A8H^8 + A10H^{10} + A12H^{12} \quad (13)$$

where X is an amount of displacement from a surface vertex in an optical axis direction, H is height from the optical axis in a direction perpendicular to the optical axis direction, R is a paraxial radius of curvature, K is a conic constant, and A4, A6, A8, A10, and A12 are aspheric coefficients.

In each Numerical Example, the focal length (mm), the F-number, and the half angle of view (°) are all values when the zoom lens according to each exemplary embodiment focuses at infinity. A back focus BF is a distance from a final lens surface to the image plane. The total length of the lens is a value obtained by adding a back focus to a distance from a first lens surface to the final lens surface.

Numerical Example 1

Unit mm
Surface data

| Surface number | r | d | nd | νd | Effective diameter |
|---|---|---|---|---|---|
| 1 | 360.812 | 1.80 | 1.84666 | 23.8 | 62.80 |
| 2 | 102.577 | 6.64 | 1.72916 | 54.7 | 60.93 |
| 3 | −772.618 | 0.15 | | | 60.54 |
| 4 | 54.305 | 6.51 | 1.72916 | 54.7 | 55.83 |
| 5 | 145.050 | (Variable) | | | 54.70 |
| 6* | 195.122 | 1.80 | 1.76802 | 49.2 | 36.16 |
| 7 | 15.928 | 10.58 | | | 25.29 |
| 8 | −25.140 | 0.90 | 1.49700 | 81.5 | 23.93 |
| 9 | −208.718 | 0.15 | | | 23.27 |
| 10 | 47.367 | 2.32 | 1.89286 | 20.4 | 22.65 |
| 11 | 190.240 | (Variable) | | | 22.14 |
| 12 | ∞ | 0.50 | | | 18.72 |
| (Diaphragm) | | | | | |
| 13 | 18.368 | 0.80 | 1.88300 | 40.8 | 20.01 |
| 14 | 13.125 | 7.95 | 1.58313 | 59.4 | 19.19 |
| 15* | −57.788 | 0.99 | | | 18.82 |
| 16 | −87.965 | 0.80 | 1.76200 | 40.1 | 18.45 |
| 17 | 16.252 | 3.22 | 2.00069 | 25.5 | 18.08 |
| 18 | 34.593 | 1.40 | | | 17.70 |
| 19 | 15.903 | 0.80 | 2.00100 | 29.1 | 17.88 |
| 20 | 11.311 | 6.81 | 1.53775 | 74.7 | 16.78 |
| 21 | 6552.763 | 0.15 | | | 16.11 |
| 22 | 39.790 | 0.80 | 1.85478 | 24.8 | 15.80 |
| 23 | 19.824 | 4.52 | 1.58313 | 59.4 | 15.92 |
| 24* | −36.018 | (Variable) | | | 16.42 |
| 25 | 64.857 | 0.80 | 1.57250 | 57.7 | 17.03 |
| 26 | 16.869 | (Variable) | | | 17.11 |
| 27* | −20.265 | 1.50 | 1.58313 | 59.4 | 22.44 |
| 28* | −77.916 | (Variable) | | | 27.23 |
| 29 | −98.804 | 5.29 | 1.88300 | 40.8 | 35.44 |
| 30 | −34.131 | (Variable) | | | 36.52 |
| Image plane | ∞ | | | | |

Aspheric surface data

Sixth surface
K = 0.00000e+000 A4 = 7.28875e−006 A6 = −2.03079e−008
A8 = 6.78458e−011 A10 = −1.61143e−013 A12 = 1.59482e−016
Fifteenth surface
K = 0.00000e+000 A4 = 2.25823e−005 A6 = −4.01819e−008
A8 = −1.92298e−010 A10 = 3.85842e−013
Twenty-fourth surface
K = 0.00000e+000 A4 = 4.03627e−005 A6 = 2.28646e−008
A8 = 1.73530e−010 A10 = −8.03393e−012
Twenty-seventh surface
K = 0.00000e+000 A4 = −9.10759e−006 A6 = −3.96094e−007
A8 = 1.03168e−009 A10 = 4.30404e−012 A12 = −1.28909e−013
Twenty-eighth surface
K = 0.00000e+000 A4 = −1.23220e−005 A6 = −2.88150e−007
A8 = 2.01026e−009 A10 = −1.01180e−011 A12 = 1.58725e−014

Various data

Zoom ratio 4.12

| | Wide-angle | Intermediate | Telephoto |
|---|---|---|---|
| Focal length | 24.72 | 57.08 | 101.89 |
| F-number | 4.12 | 4.12 | 4.12 |
| Angle of view | 41.19 | 20.76 | 11.99 |
| Image height | 21.64 | 21.64 | 21.64 |
| Total length of lens | 120.52 | 140.11 | 159.71 |
| BF | 13.52 | 18.44 | 26.90 |
| d5 | 0.70 | 18.51 | 35.81 |
| d11 | 24.20 | 9.43 | 2.38 |
| d24 | 1.58 | 2.26 | 0.96 |
| d26 | 12.56 | 11.89 | 13.18 |
| d28 | 0.78 | 12.42 | 13.30 |
| d30 | 13.52 | 18.44 | 26.90 |

Zoom lens group data

| Unit | Start surface | Focal length |
|---|---|---|
| 1 | 1 | 92.83 |
| 2 | 6 | −20.76 |
| 3 | 12 | 22.08 |
| 4 | 25 | −40.07 |
| 5 | 27 | −47.42 |
| 6 | 29 | 56.87 |

Numerical Example 2

Unit mm
Surface data

| Surface number | r | d | nd | vd | Effective diameter |
|---|---|---|---|---|---|
| 1 | 457.815 | 2.10 | 1.84666 | 23.8 | 68.31 |
| 2 | 102.115 | 6.44 | 1.77250 | 49.6 | 65.81 |
| 3 | 1437.112 | 0.15 | | | 65.28 |
| 4 | 58.311 | 7.34 | 1.77250 | 49.6 | 59.87 |
| 5 | 182.081 | (Variable) | | | 58.58 |
| 6* | 156.913 | 1.80 | 1.85400 | 40.4 | 39.98 |
| 7* | 19.258 | 9.93 | | | 29.40 |
| 8 | −40.599 | 1.00 | 1.53775 | 74.7 | 28.42 |
| 9 | 25.229 | 6.70 | 1.85478 | 24.8 | 25.83 |
| 10 | −75.996 | 3.99 | | | 24.78 |
| 11 | −27.960 | 1.55 | 1.51742 | 52.4 | 20.98 |
| 12 | −22.614 | 0.90 | 2.00100 | 29.1 | 21.30 |
| 13 | −44.959 | (Variable) | | | 22.40 |
| 14 (Diaphragm) | ∞ | 0.50 | | | 24.33 |
| 15 | 26.600 | 3.79 | 1.43875 | 94.9 | 26.37 |
| 16 | 76.837 | 0.15 | | | 26.33 |
| 17 | 26.884 | 1.00 | 1.88300 | 40.8 | 26.61 |
| 18 | 15.319 | 10.32 | 1.61881 | 63.9 | 24.85 |
| 19* | −79.194 | 0.96 | | | 24.35 |
| 20 | −101.307 | 0.90 | 1.72047 | 34.7 | 24.19 |
| 21 | 20.340 | 3.68 | 2.00100 | 29.1 | 24.01 |
| 22 | 41.892 | 3.51 | | | 23.68 |
| 23 | 28.473 | 0.90 | 2.00100 | 29.1 | 24.29 |
| 24 | 17.666 | 9.43 | 1.72916 | 54.7 | 23.28 |
| 25* | −26.848 | (Variable) | | | 22.69 |
| 26 | 61.322 | 0.80 | 1.83481 | 42.7 | 21.51 |
| 27 | 23.239 | (Variable) | | | 20.99 |
| 28* | −25.127 | 1.50 | 1.85400 | 40.4 | 22.71 |
| 29* | −69.764 | (Variable) | | | 26.23 |
| 30 | −44.620 | 3.96 | 2.00100 | 29.1 | 35.54 |
| 31 | −28.914 | (Variable) | | | 36.53 |
| Image plane | ∞ | | | | |

Aspheric surface data

Sixth surface
K = 0.00000e+000 A4 = −1.41095e−006 A6 = 3.45657e−008
A8 = −1.07605e−010 A10 = 1.58603e−013 A12 = −8.57988e−017
Seventh surface
K = 0.00000e+000 A4 = −7.83038e−006 A6 = 1.45488e−008
A8 = 9.28901e−011 A10 = −5.25682e−013
Nineteenth surface
K = 0.00000e+000 A4 = 2.38855e−005 A6 = −1.01986e−008
A8 = −1.01928e−011 A10 = 4.97492e−014
Twenty-fifth surface
K = 0.00000e+000 A4 = 2.75519e−005 A6 = −3.81740e−008
A8 = 2.22228e−011 A10 = 7.70144e−015
Twenty-eighth surface
K = 0.00000e+000 A4 = 8.71027e−006 A6 = −7.11280e−007
A8 = 2.97814e−009 A10 = −9.93103e−012 A12 = −3.41237e−014
Twenty-ninth surface
K = 0.00000e+000 A4 = 7.65026e−006 A6 = −5.84476e−007
A8 = 3.80156e−009 A10 = −1.61546e−011 A12 = 2.91996e−014

Various data

| Zoom ratio | | 2.75 | |
|---|---|---|---|
| | Wide-angle | Intermediate | Telephoto |
| Focal length | 24.72 | 47.12 | 67.87 |
| F-number | 2.91 | 2.91 | 2.91 |
| Angle of view | 41.19 | 24.66 | 17.68 |
| Image height | 21.64 | 21.64 | 21.64 |
| Total length of lens | 131.52 | 148.87 | 166.23 |
| BF | 18.27 | 22.71 | 26.93 |
| d5 | 0.70 | 14.03 | 27.17 |
| d13 | 16.79 | 5.47 | 2.37 |
| d25 | 1.63 | 1.82 | 0.96 |
| d27 | 9.90 | 9.72 | 10.57 |
| d29 | 0.91 | 11.81 | 14.90 |
| d31 | 18.27 | 22.71 | 26.93 |

Zoom lens group data

| Unit | Start surface | Focal length |
|---|---|---|
| 1 | 1 | 102.24 |
| 2 | 6 | −20.14 |
| 3 | 14 | 23.07 |
| 4 | 26 | −45.26 |
| 5 | 28 | −46.71 |
| 6 | 30 | 72.87 |

Numerical Example 3

Unit mm
Surface data

| Surface number | r | d | nd | vd | Effective diameter |
|---|---|---|---|---|---|
| 1 | 238.414 | 2.10 | 1.95375 | 32.3 | 66.00 |
| 2 | 106.904 | 6.14 | 1.49700 | 81.5 | 61.97 |
| 3 | −2696.186 | 0.15 | | | 61.86 |
| 4 | 100.111 | 5.67 | 1.49700 | 81.5 | 61.16 |
| 5 | 1039.311 | 0.15 | | | 60.75 |
| 6 | 78.303 | 5.25 | 1.49700 | 81.5 | 58.47 |
| 7 | 247.955 | (Variable) | | | 57.77 |
| 8* | 382.720 | 1.00 | 1.85135 | 40.1 | 32.74 |
| 9* | 15.693 | 9.93 | | | 24.38 |
| 10 | −20.916 | 0.80 | 1.49700 | 81.5 | 22.95 |
| 11 | 76.879 | 0.15 | | | 22.38 |
| 12 | 58.907 | 4.49 | 1.92119 | 24.0 | 22.59 |
| 13 | −39.904 | 3.50 | | | 23.23 |
| 14 | −21.252 | 0.85 | 1.95375 | 32.3 | 23.53 |
| 15 | −33.913 | (Variable) | | | 24.96 |
| 16 (Diaphragm) | ∞ | 0.39 | | | 26.83 |
| 17* | 25.080 | 7.85 | 1.63980 | 34.5 | 29.98 |
| 18* | −83.068 | 0.15 | | | 29.62 |
| 19 | 52.557 | 5.62 | 1.51633 | 64.1 | 28.30 |
| 20 | −151.305 | 0.15 | | | 26.87 |
| 21 | −349.132 | 0.90 | 2.00100 | 29.1 | 26.44 |
| 22 | 18.277 | 6.54 | 1.51742 | 52.4 | 24.36 |
| 23 | 190.216 | (Variable) | | | 24.51 |
| 24 | 31.222 | 0.80 | 2.00069 | 25.5 | 25.30 |
| 25 | 16.268 | 9.12 | 1.76200 | 40.1 | 24.08 |
| 26 | 702.918 | 0.73 | | | 23.57 |
| 27 | 1024.579 | 2.77 | 1.58313 | 59.4 | 23.43 |
| 28* | −45.978 | (Variable) | | | 23.26 |
| 29 | 184.776 | 3.56 | 2.00069 | 25.5 | 18.22 |
| 30 | −26.133 | 0.75 | 1.95375 | 32.3 | 18.24 |
| 31 | 41.415 | (Variable) | | | 18.23 |
| 32 | 86.680 | 1.10 | 2.00100 | 29.1 | 23.11 |
| 33 | 18.513 | 7.29 | 1.61293 | 37.0 | 23.47 |
| 34 | 1330.468 | 0.15 | | | 25.29 |
| 35 | 121.215 | 11.40 | 1.71736 | 29.5 | 26.10 |
| 36 | −17.028 | 1.30 | 1.91082 | 35.3 | 27.67 |
| 37* | 17502.678 | (Variable) | | | 32.50 |
| 38 | 63.160 | 3.42 | 1.85478 | 24.8 | 36.60 |
| 39 | 349.390 | 1.30 | 2.00100 | 29.1 | 36.57 |
| 40 | 131.704 | (Variable) | | | 36.51 |
| Image plane | ∞ | | | | |

Aspheric surface data

Eighth surface
K = 0.00000e+000 A4 = 3.01361e−007 A6 = 2.50588e−008
A8 = −3.48140e−011 A10 = 4.64746e−014
Ninth surface
K = 0.00000e+000 A4 = −1.97615e−005 A6 = −3.80863e−008

-continued

Seventeenth surface
K = 0.00000e+000 A4 = −5.89468e−006 A6 = −3.70002e−009
A8 = −2.36358e−012 A10 = −2.05744e−014
Eighteenth surface
K = 0.00000e+000 A4 = 6.90751e−006 A6 = −3.91500e−009
Twenty-eighth surface
K = 0.00000e+000 A4 = 5.47126e−006 A6 = −8.28986e−009
A8 = −1.65522e−011 A10 = −1.78623e−013
Thirty-seventh surface
K = 0.00000e+000 A4 = −7.62243e−006 A6 = −7.72939e−009
A8 = 2.74005e−012 A10 = −3.54345e−014

Various data

Zoom ratio 11.77

| | Wide-angle | Intermediate | Telephoto |
|---|---|---|---|
| Focal length | 24.72 | 90.83 | 290.86 |
| F-number | 4.12 | 5.00 | 5.88 |
| Angle of view | 41.19 | 13.40 | 4.25 |
| Image height | 21.64 | 21.64 | 21.64 |
| Total length of lens | 165.57 | 210.57 | 255.57 |
| BF | 14.37 | 32.56 | 30.89 |
| d7 | 0.69 | 36.77 | 67.77 |
| d15 | 29.33 | 9.51 | 0.59 |
| d23 | 2.42 | 1.00 | 2.40 |
| d28 | 1.00 | 8.71 | 7.67 |
| d31 | 11.28 | 11.05 | 20.62 |
| d37 | 1.00 | 5.48 | 20.13 |
| d40 | 14.37 | 32.56 | 30.89 |

Zoom lens group data

| Unit | Start surface | Focal length |
|---|---|---|
| 1 | 1 | 114.54 |
| 2 | 8 | −15.91 |
| 3 | 16 | 47.18 |
| 4 | 24 | 35.80 |
| 5 | 29 | −64.31 |
| 6 | 32 | −63.57 |
| 7 | 38 | 151.52 |

Numerical Example 4

Unit mm
Surface data

| Surface number | r | d | nd | vd | Effective diameter |
|---|---|---|---|---|---|
| 1 | 429.229 | 1.80 | 1.84666 | 23.8 | 63.30 |
| 2 | 129.679 | 5.26 | 1.72916 | 54.7 | 62.03 |
| 3 | −2279.753 | 0.15 | | | 61.68 |
| 4 | 63.144 | 6.14 | 1.72916 | 54.7 | 57.94 |
| 5 | 181.719 | (Variable) | | | 56.96 |
| 6* | 444.999 | 1.80 | 1.76802 | 49.2 | 41.04 |
| 7 | 18.334 | 12.32 | | | 29.25 |
| 8 | −28.007 | 0.90 | 1.49700 | 81.5 | 28.19 |
| 9 | −87.991 | 0.15 | | | 27.90 |
| 10 | 54.487 | 2.54 | 1.89286 | 20.4 | 27.05 |
| 11 | 197.466 | (Variable) | | | 26.54 |
| 12 (Diaphragm) | ∞ | 0.50 | | | 21.36 |
| 13 | 21.758 | 0.80 | 1.88300 | 40.8 | 22.63 |
| 14 | 15.435 | 8.36 | 1.58313 | 59.4 | 21.81 |
| 15* | −56.674 | 0.99 | | | 21.48 |
| 16 | −101.283 | 0.80 | 1.76200 | 40.1 | 21.03 |
| 17 | 18.419 | 3.45 | 2.00069 | 25.5 | 20.57 |
| 18 | 39.245 | 1.67 | | | 20.17 |
| 19 | 18.103 | 0.80 | 2.00100 | 29.1 | 20.30 |
| 20 | 12.952 | 9.83 | 1.53775 | 74.7 | 19.12 |
| 21 | −82.340 | 0.15 | | | 17.92 |
| 22 | 76.800 | 0.80 | 1.85478 | 24.8 | 17.36 |
| 23 | 28.145 | 4.03 | 1.58313 | 59.4 | 16.77 |
| 24* | −50.736 | (Variable) | | | 17.21 |
| 25 | 58.045 | 0.80 | 1.57250 | 57.7 | 17.90 |
| 26 | 17.128 | (Variable) | | | 17.92 |
| 27* | −23.790 | 1.50 | 1.58313 | 59.4 | 22.82 |
| 28* | −93.823 | (Variable) | | | 27.09 |
| 29 | −63.749 | 4.68 | 1.88300 | 40.8 | 35.43 |
| 30 | −32.022 | (Variable) | | | 36.51 |
| 31 | 155.829 | 1.91 | 1.83481 | 42.7 | 42.15 |
| 32 | 351.247 | (Variable) | | | 42.14 |
| Image plane | ∞ | | | | |

Aspheric surface data

Sixth surface
K = 0.00000e+000 A4 = 6.53773e−006 A6 = −1.12142e−008
A8 = 2.35316e−011 A10 = −3.77465e−014 A12 = 2.66659e−017
Fifteenth surface
K = 0.00000e+000 A4 = 1.55231e−005 A6 = −2.87309e−008
A8 = 2.20515e−011 A10 = −1.77413e−013
Twenty-fourth surface
K = 0.00000e+000 A4 = 2.54826e−005 A6 = 5.96854e−008
A8 = −7.03456e−010 A10 = 1.54199e−012
Twenty-seventh surface
K = 0.00000e+000 A4 = −4.25162e−006 A6 = −3.98601e−007
A8 = 1.32578e−009 A10 = 1.61897e−012 A12 = −9.58394e−014
Twenty-eighth surface
K = 0.00000e+000 A4 = −3.65848e−006 A6 = −3.41509e−007
A8 = 2.38399e−009 A10 = −1.18165e−011 A12 = 1.84765e − 014

Various data

Zoom ratio 4.12

| | Wide-angle | Intermediate | Telephoto |
|---|---|---|---|
| Focal length | 24.72 | 60.36 | 101.89 |
| F-number | 4.12 | 4.12 | 4.12 |
| Angle of view | 41.19 | 19.72 | 11.99 |
| Image height | 21.64 | 21.64 | 21.64 |
| Total length of lens | 134.63 | 158.14 | 181.65 |
| BF | 14.13 | 14.13 | 14.13 |
| d5 | 0.70 | 22.69 | 40.35 |
| d11 | 32.05 | 12.53 | 4.85 |
| d24 | 2.24 | 2.49 | 1.00 |
| d26 | 11.82 | 11.57 | 13.06 |
| d28 | 0.79 | 15.17 | 16.86 |
| d30 | 0.79 | 7.45 | 19.28 |
| d32 | 14.13 | 14.13 | 14.13 |

Zoom lens group data

| Unit | Start surface | Focal length |
|---|---|---|
| 1 | 1 | 110.32 |
| 2 | 6 | −25.11 |
| 3 | 12 | 25.20 |
| 4 | 25 | −42.74 |
| 5 | 27 | −55.09 |
| 6 | 29 | 68.15 |
| 7 | 31 | 334.02 |

Various numerical values in each Numerical Example are summarized in Table 1.

TABLE 1

| Conditional Expression | | First Exemplary Embodiment | Second Exemplary Embodiment | Third Exemplary Embodiment | Fourth Exemplary Embodiment |
|---|---|---|---|---|---|
| (1) | |fLF/fLP| | 0.70 | 0.62 | 0.42 | 0.63 |
| (2) | |fLF/ft| | 0.39 | 0.67 | 0.22 | 0.42 |
| (3) | fLP/fw | 2.30 | 2.95 | 6.13 | 2.76 |

TABLE 1-continued

| Conditional Expression | | First Exemplary Embodiment | Second Exemplary Embodiment | Third Exemplary Embodiment | Fourth Exemplary Embodiment |
|---|---|---|---|---|---|
| (4) | mLP/ft | 0.13 | 0.13 | 0.12 | 0.18 |
| (5) | (dt − dw)/ft | 0.12 | 0.21 | 0.07 | 0.16 |
| (6) | \|βrt/βrw\| | 1.14 | 1.20 | 1.31 | 1.16 |
| (7) | \|(1 − βLFt$^2$) × βrt$^2$/Fnot\| | 1.24 | 1.65 | 1.19 | 1.29 |
| (8) | (r1 + r2)/(r1 − r2) | 1.70 | 2.22 | 1.58 | 1.84 |
| (9) | fLF/fLN | 0.84 | 0.97 | 1.01 | 0.78 |
| (10) | f1/ft | 0.91 | 1.51 | 0.39 | 1.08 |
| (11) | \|f2/fw\| | 0.84 | 0.81 | 0.64 | 1.02 |

[Image Pickup Apparatus]

Figure 13:
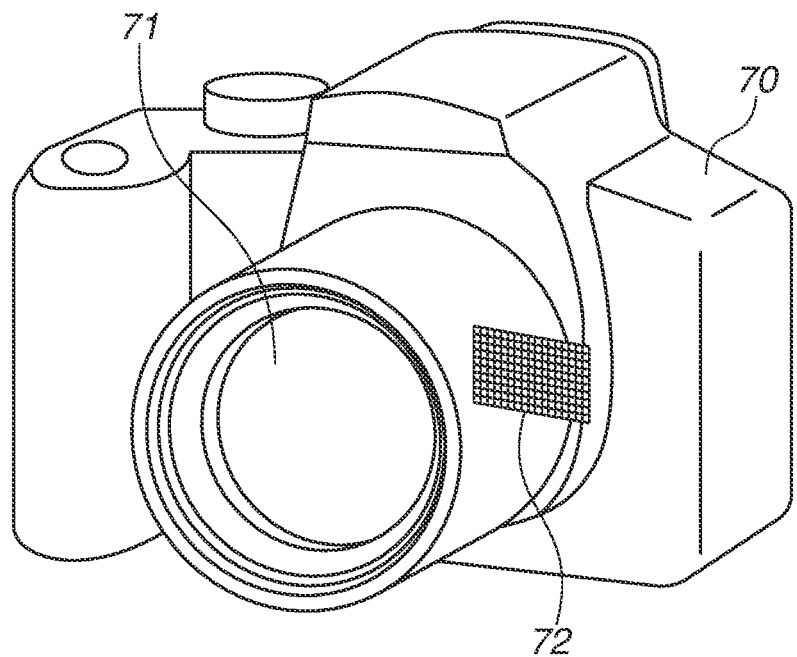
FIG. 13 is a schematic view of an image pickup apparatus.

FIG. 13 is a schematic view of an image pickup apparatus (digital still camera) 100 as an exemplary embodiment of the present invention. The image pickup apparatus 100 according to the present exemplary embodiment includes a camera body 70, a zoom lens 71 similar to any one of the zoom lenses according to the above-described first to fourth exemplary embodiments, and an image pickup element 72 that photoelectrically converts an image formed by the zoom lens 71. As the image pickup element 72, an image pickup element such as a CCD sensor or a CMOS sensor can be used.

Since the image pickup apparatus 100 according to the present exemplary embodiment has the zoom lens 71 similar to any one of the zoom lenses according to the first to fourth exemplary embodiments, it is easy to perform drive control of the focus lens unit. In addition, since a distance from the exit pupil to the image plane at the wide-angle end is long, high quality images can be obtained from a center to a periphery of a screen.

Note that the zoom lens according to each of the above-described exemplary embodiments can be applied not only to the digital still camera illustrated in FIG. 13, but also to various optical apparatuses such as a silver-halide film camera, a video camera, and a telescope.

Although the exemplary embodiments and examples of the present invention have been described above, the present invention is not limited to these exemplary embodiments and examples, and various combinations, modifications, and changes are possible within the scope of the gist of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A zoom lens comprising:
   a first lens unit having positive refractive power;
   a second lens unit having negative refractive power; and
   a rear lens group including a plurality of lens units and having positive refractive power,
   the first lens unit, the second lens unit, and the rear lens group being disposed in order from an object side to an image side,
   wherein a distance between adjacent lens units changes during zooming,
   wherein the rear lens group includes a positive lens unit having positive refractive power, a lens unit LF disposed on the image side of the positive lens unit and configured to move during focusing and having negative refractive power, a lens unit LN disposed on the image side of the lens unit LF and having negative refractive power, and at least one lens unit disposed on the image side of the lens unit LN and having positive refractive power,
   wherein a lens unit LP and the lens unit LN, the lens unit LP having the largest refractive power among the at least one lens unit having positive refractive power disposed on the image side of the lens unit LN, move to the object side such that a distance between the lens unit LP and the lens unit LN increases during zooming from a wide-angle end to a telephoto end, and
   wherein the following conditional expressions are satisfied:

$$0.36 < |fLF/fLP| < 1.30, \text{ and}$$

$$2.0 < fLP/fw < 7.0,$$

where fLP is a focal length of the lens unit LP, fLF is a focal length of the lens unit LF and fw is a focal length of the zoom lens at the wide-angle end.

2. The zoom lens according to claim 1, wherein the following conditional expression is satisfied:

$$0.2 < |fLF/ft| < 1.0,$$

where ft is a focal length of the zoom lens at the telephoto end.

3. The zoom lens according to claim 1, wherein the following conditional expression is satisfied:

$$0.05 < mLP/ft < 0.50,$$

where mLP is an amount of movement of the lens unit LP accompanied by zooming from the wide-angle end to the telephoto end, and ft is a focal length of the zoom lens at the telephoto end.

4. The zoom lens according to claim 1, wherein the following conditional expression is satisfied:

$$0.05 < (dt − dw)/ft < 0.50,$$

where dw is a distance between the lens unit LN and the lens unit LP at the wide-angle end, dt is a distance between the lens unit LN and the lens unit LP at the telephoto end, and ft is a focal length of the zoom lens at the telephoto end.

5. The zoom lens according to claim 1, wherein the following conditional expression is satisfied:

$$1.0 < |βrt/βrw| < 2.0,$$

where βrw is composite lateral magnification of lens units disposed on the image side of the lens unit LF at the wide-angle end, and βrt is composite lateral magnification of lens units disposed on the image side of the lens unit LF at the telephoto end.

6. The zoom lens according to claim 1, wherein the following conditional expression is satisfied:

$$0.8 < |(1 − βLFt^2) × βrt^2/Fnot| < 2.0,$$

where βLFt is lateral magnification of the lens unit LF at the telephoto end, βrt is composite lateral magnification of lens units disposed on the image side of the lens unit LF at the telephoto end, and Fnot is an F-number of the zoom lens at the telephoto end.

7. The zoom lens according to claim 1, wherein the following conditional expression is satisfied:

$$1.0<(r1+r2)/(r1-r2)<3.0,$$

where r1 is a curvature radius of a lens surface closest to the object side of the lens unit LF, and r2 is a curvature radius of a lens surface closest to the image side of the lens unit LF.

8. The zoom lens according to claim 1, wherein the following conditional expression is satisfied:

$$0.5<fLF/fLN<1.5,$$

where fLN is a focal length of the lens unit LN.

9. The zoom lens according to claim 1, wherein the following conditional expression is satisfied:

$$0.3<f1/ft<2.0,$$

where f1 is a focal length of the first lens unit, and ft is a focal length of the zoom lens at the telephoto end.

10. The zoom lens according to claim 1, wherein the following conditional expression is satisfied:

$$0.5<|f2/fw|<1.5,$$

where f2 is a focal length of the second lens unit, and fw is a focal length of the zoom lens at the wide-angle end.

11. The zoom lens according to claim 1, wherein the lens unit LF includes one negative lens.

12. The zoom lens according to claim 1, wherein the lens unit LN is disposed adjacent to the lens unit LF.

13. The zoom lens according to claim 1, wherein the lens unit LN includes one negative lens.

14. The zoom lens according to claim 1, wherein the lens unit LP includes one positive lens.

15. The zoom lens according to claim 1, wherein the rear lens group includes:
   a third lens unit having positive refractive power,
   a fourth lens unit having negative refractive power and serving as the lens unit LF,
   a fifth lens unit having negative refractive power and serving as the lens unit LN, and
   a sixth lens unit having positive refractive power and serving as the lens unit LP,
   the third lens unit, the fourth lens unit, the fifth lens unit, and the sixth lens unit being disposed in order from the object side to the image side.

16. The zoom lens according to claim 1, wherein the rear lens group comprises:
   a third lens unit having positive refractive power,
   a fourth lens unit having positive refractive power,
   a fifth lens unit having negative refractive power and serving as the lens unit LF,
   a sixth lens unit having negative refractive power and serving as the lens unit LN, and
   a seventh lens unit having positive refractive power and serving as the lens unit LP,
   the third lens unit, the fourth lens unit, the fifth lens unit, the sixth lens unit, and the seventh lens unit being disposed in order from the object side to the image side.

17. The zoom lens according to claim 1, wherein the rear lens group comprises:
   a third lens unit having positive refractive power,
   a fourth lens unit having negative refractive power and serving as the lens unit LF,
   a fifth lens unit having negative refractive power and serving as the lens unit LN,
   a sixth lens unit having positive refractive power and serving as the lens unit LP, and
   a seventh lens unit having positive refractive power and having a focal length larger than that of the sixth lens unit,
   the third lens unit, the fourth lens unit, the fifth lens unit, the sixth lens unit, and the seventh lens unit being disposed in order from the object side to the image side.

18. An image pickup apparatus comprising:
   a zoom lens; and
   an image pickup element configured to receive an image formed by the zoom lens,
   wherein the zoom lens includes:
      a first lens unit having positive refractive power,
      a second lens unit having negative refractive power, and
      a rear lens group including a plurality of lens units and having positive refractive power,
      the first lens unit, the second lens unit, and the rear lens group being disposed in order from an object side to an image side,
   wherein a distance between adjacent lens units changes during zooming,
   wherein the rear lens group includes a positive lens unit having positive refractive power, a lens unit LF disposed on the image side of the positive lens unit and configured to move during focusing and having negative refractive power, a lens unit LN disposed on the image side of the lens unit LF and having negative refractive power, and at least one lens unit disposed on the image side of the lens unit LN and having positive refractive power,
   wherein a lens unit LP and the lens unit LN, the lens unit LP having the largest refractive power among the at least one lens unit having positive refractive power disposed on the image side of the lens unit LN, move to the object side such that a distance between the lens unit LP and the lens unit LN increases during zooming from a wide-angle end to a telephoto end, and
   wherein the following conditional expressions are satisfied:

$$0.36<|fLF/fLP|<1.30, \text{ and}$$

$$2.0<fLP/fw<7.0,$$

where fLP is a focal length of the lens unit LP and fLF is a focal length of the lens unit LF and fw is a focal length of the zoom lens at the wide-angle end.

19. A zoom lens comprising:
   a first lens unit having positive refractive power;
   a second lens unit having negative refractive power; and
   a rear lens group including a plurality of lens units and having positive refractive power,
   the first lens unit, the second lens unit, and the rear lens group being disposed in order from an object side to an image side,
   wherein a distance between adjacent lens units changes during zooming,
   wherein the rear lens group includes a positive lens unit having positive refractive power, a lens unit LF disposed on the image side of the positive lens unit and configured to move during focusing and having negative refractive power, a lens unit LN disposed on the image side of the lens unit LF and having negative refractive power, and at least one lens unit disposed on the image side of the lens unit LN and having positive refractive power,
   wherein a lens unit LP and the lens unit LN, the lens unit LP having the largest refractive power among the at least one lens unit having positive refractive power disposed on the image side of the lens unit LN, move to the object side such that a distance between the lens unit LP and the lens unit LN increases during zooming from a wide-angle end to a telephoto end, and wherein the following conditional expressions are satisfied:

$$0.36<|fLF/fLP|<1.30, \text{ and}$$

$$0.5<fLF/fLN<1.5,$$

where fLP is a focal length of the lens unit LP, fLF is a focal length of the lens unit LF and fLN is a focal length of the lens unit LN.

20. An image pickup apparatus comprising:
a zoom lens; and
an image pickup element configured to receive an image formed by the zoom lens,
wherein the zoom lens includes:
a first lens unit having positive refractive power;
a second lens unit having negative refractive power; and
a rear lens group including a plurality of lens units and having positive refractive power,
the first lens unit, the second lens unit, and the rear lens group being disposed in order from an object side to an image side,
wherein a distance between adjacent lens units changes during zooming,
wherein the rear lens group includes a positive lens unit having positive refractive power, a lens unit LF disposed on the image side of the positive lens unit and configured to move during focusing and having negative refractive power, a lens unit LN disposed on the image side of the lens unit LF and having negative refractive power, and at least one lens unit disposed on the image side of the lens unit LN and having positive refractive power,
wherein a lens unit LP and the lens unit LN, the lens unit LP having the largest refractive power among the at least one lens unit having positive refractive power disposed on the image side of the lens unit LN, move to the object side such that a distance between the lens unit LP and the lens unit LN increases during zooming from a wide-angle end to a telephoto end, and
wherein the following conditional expressions are satisfied:

$$0.36<|fLF/fLP|<1.30, \text{ and}$$

$$0.5<fLF/fLN<1.5,$$

where fLP is a focal length of the lens unit LP, fLF is a focal length of the lens unit LF and fLN is a focal length of the lens unit LN.

21. A zoom lens comprising:
a first lens unit having positive refractive power;
a second lens unit having negative refractive power; and
a rear lens group including a plurality of lens units and having positive refractive power,
the first lens unit, the second lens unit, and the rear lens group being disposed in order from an object side to an image side,
wherein a distance between adjacent lens units changes during zooming,
wherein the rear lens group includes a lens unit LF configured to move during focusing and having negative refractive power, a negative lens LN disposed adjacent to the image side of the lens unit LF and having negative refractive power, and positive lens LP disposed adjacent to the image side of the negative lens LN and having positive refractive power,
wherein the positive lens LP is a lens that is disposed closest to the image side in the rear lens unit,
wherein the positive lens LP and the negative lens LN move to the object side during zooming from a wide-angle end to a telephoto end, and
wherein the following conditional expressions are satisfied:

$$0.36<|fLF/fLP|<1.30, \text{ and}$$

where fLP is a focal length of the positive lens LP, fLF is a focal length of the lens unit LF.

22. The zoom lens according to claim 1, wherein the rear lens group includes a positive lens unit disposed adjacent to the object side of the lens unit LF.

23. The zoom lens according to claim 21, wherein the following conditional expression is satisfied:

$$0.2<|fLF/ft|<1.0$$

where ft is a focal length of the zoom lens at the telephoto end.

24. The zoom lens according to claim 21, wherein the following conditional expression is satisfied:

$$1.0<fLP/fw<7.0$$

where fw is a focal length of the zoom lens at the wide-angle end.

25. The zoom lens according to claim 21, wherein the following conditional expression is satisfied:

$$0.05<mLP/ft<0.50$$

where mLP is an amount of movement of the positive lens LP accompanied by zooming from the wide-angle end to the telephoto end, and ft is a focal length of the zoom lens at the telephoto end.

26. The zoom lens according to claim 1, wherein the following conditional expression is satisfied:

$$0.8<|(1-\beta LFt^2)\times\beta rt^2/Fnot|<2.0$$

where βLFt is lateral magnification of the lens unit LF at the telephoto end, βrt is composite lateral magnification of lens units disposed on the image side of the lens unit LF at the telephoto end, and Fnot is an F- number of the zoom lens at the telephoto end.

27. The zoom lens according to claim 1, wherein the following conditional expression is satisfied:

$$1.0<(r1+r2)/(r1-r2)<3.0$$

where r1 is a curvature radius of a lens surface closest to the object side of the lens unit LF, and r2 is a curvature radius of a lens surface closest to the image side of the lens unit LF.

28. The zoom lens according to claim 1, wherein the following conditional expression is satisfied:

$$0.5<fLF/fLN<1.5$$

where fLN is a focal length of the negative lens LN.

29. The zoom lens according to claim 1, wherein the following conditional expression is satisfied:

$$0.3<f1/ft<2.0$$

where f1 is a focal length of the first lens unit, and ft is a focal length of the zoom lens at the telephoto end.

30. The zoom lens according to claim 1, wherein the following conditional expression is satisfied:

$$0.5 < f2/fw < 1.5$$

where f2 is a focal length of the second lens unit, and fw is a focal length of the zoom lens at the wide-angle end.

31. The zoom lens according to claim 1, wherein the lens unit LF consists of one negative lens.

* * * * *